(12) United States Patent
Seo et al.

(10) Patent No.: US 11,902,673 B2
(45) Date of Patent: Feb. 13, 2024

(54) ELECTRONIC DEVICE FOR COMPENSATING FOR TIME DELAY OF DYNAMIC VISION SENSOR

(71) Applicant: Samsung Electronics Co., Ltd., Suwon-si (KR)

(72) Inventors: Minwon Seo, Suwon-si (KR); Jeongseok Kim, Suwon-si (KR); Hyunsurk Ryu, Hwaseong-si (KR); Yunjae Suh, Suwon-si (KR); Chang-Woo Shin, Hwaseong-si (KR); Woonhee Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/719,647

(22) Filed: Apr. 13, 2022

(65) Prior Publication Data
US 2023/0030562 A1  Feb. 2, 2023

(30) Foreign Application Priority Data
Jul. 29, 2021  (KR) .......... 10-2021-0099717

(51) Int. Cl.
*H04N 23/76*  (2023.01)
*G06T 5/00*  (2006.01)
(Continued)

(52) U.S. Cl.
CPC ............. *H04N 23/76* (2023.01); *G06T 5/003* (2013.01); *H04N 23/45* (2023.01); *H04N 23/71* (2023.01); *G06T 2207/10152* (2013.01)

(58) Field of Classification Search
CPC ........ H04N 23/76; H04N 23/45; H04N 23/71; H04N 23/683; H04N 23/60; H04N 25/57;
(Continued)

(56) References Cited

U.S. PATENT DOCUMENTS 9,257,461 B2    2/2016  Cho et al.
10,567,679 B2 * 2/2020  Berner ................. H04N 25/40
(Continued)

FOREIGN PATENT DOCUMENTS

CN    111770290 A    10/2020
CN    112422798 A    2/2021
(Continued)

OTHER PUBLICATIONS

Pan, L. et al. "Bringing a Blurry Frame Alive at High Frame-Rate with an Event Camera." Computer Vision Foundation, CVPR, Nov. 27, 2018.
(Continued)

*Primary Examiner* — Luong T Nguyen
(74) *Attorney, Agent, or Firm* — Harness, Dickey & Pierce, P.L.C.

(57) ABSTRACT

Disclosed is an electronic device which includes a dynamic vision sensor that includes a first pixel sensing a change in light intensity and generates an event signal based on the sensed change in light intensity, an illuminance estimator that estimates illuminance of a light, and a time delay compensator that calculates a time delay between a first time at which the change in light intensity occurs and a second time at which the first pixel senses the change in light intensity, based on the illuminance of the light, and to compensate for the time delay.

20 Claims, 17 Drawing Sheets

(51) Int. Cl.
*H04N 23/45* (2023.01)
*H04N 23/71* (2023.01)

(58) Field of Classification Search
CPC ...... H04N 23/741; H04N 25/60; H04N 25/76; G06T 5/003; G06T 2207/10152
See application file for complete search history.

(56) References Cited

U.S. PATENT DOCUMENTS

| | | |
|---|---|---|
| 10,771,669 B1 | 9/2020 | Balasubramanian et al. |
| 2018/0063435 A1* | 3/2018 | Cho ........................ H04N 23/67 |
| 2019/0355169 A1* | 11/2019 | Sapienza ................ G06V 20/70 |
| 2020/0084403 A1* | 3/2020 | Suh ........................ H04N 25/75 |
| 2020/0226377 A1 | 7/2020 | Campos Macias et al. |
| 2020/0404177 A1 | 12/2020 | Sapienza et al. |
| 2021/0360181 A1* | 11/2021 | Naganuma ............. H04N 25/76 |

FOREIGN PATENT DOCUMENTS

| | | |
|---|---|---|
| KR | 102054774 B1 | 12/2019 |
| KR | 10-2020-0005452 A | 1/2020 |

OTHER PUBLICATIONS

Son, B. et al. "A 640×480 Dynamic Vision Sensor with a 9?m Pixel and 300Meps Address-Event Representation." 2017 IEEE International Solid-State Circuits Conference.

* cited by examiner

ELECTRONIC DEVICE FOR COMPENSATING FOR TIME DELAY OF DYNAMIC VISION SENSOR

CROSS-REFERENCE TO RELATED APPLICATIONS

This application claims priority under 35 U.S.C. § 119 to Korean Patent Application No. 10-2021-0099717 filed on Jul. 29, 2021, in the Korean Intellectual Property Office, the disclosures of which are incorporated by reference herein in their entireties.

BACKGROUND

Embodiments of the present disclosure described herein relate to an electronic device for compensating for a time delay of a dynamic vision sensor, and more particularly, relate to an electronic device for compensating for an event occurrence time delay of a dynamic vision sensor.

As semiconductor technologies develop, sensors are being diversified. A sensor includes a charge coupled device (CCD) image sensor, a dynamic vision sensor (DVS), an ambient light sensor (ALS), a proximity sensor (PS), and/or the like.

An electronic device may respond to an input from the outside by using the sensor. The input from the outside may include a change in intensity of light, a touch of a user, and/or the like. When an input is received from the outside, the sensor may output an electrical signal. The electronic device may recognize a movement of an object present on the outside or a change in an ambient environment, based on the electrical signal.

For example, when the dynamic vision sensor senses a change in the intensity of light, a time at which the dynamic vision sensor senses a change in the intensity of light may vary depending on an ambient environment. Accordingly, time data included in an event signal of the dynamic vision sensor may differ from an actual event occurrence time. This may cause a reduction in performance of the electronic device using the dynamic vision sensor. Also, in the case where an electronic device in which a sensor different from the dynamic vision sensor is implemented together with the dynamic vision sensor, synchronization between the different sensors may not be achieved.

SUMMARY

Embodiments of the present disclosure provide an electronic device for compensating for a reaction time delay of a dynamic vision sensor due to illuminance or a change in illuminance.

According to example embodiments, an electronic device includes a dynamic vision sensor that includes a first pixel sensing a change in light intensity and generates an event signal based on the sensed change in light intensity, an illuminance estimator that estimates illuminance of a light, and a time delay compensator that calculates a time delay between a first time at which the change in light intensity occurs and a second time at which the first pixel senses the change in light intensity, based on the illuminance of the light, and to compensate for the time delay.

According to example embodiments, an electronic device includes a dynamic vision sensor that includes a first pixel sensing a change in light intensity and generates a first event signal based on the sensed change in light intensity, an image processing device that includes a complementary metal-oxide-semiconductor (CMOS) image sensor generating first image data based on an intensity of light, an illuminance calculator that calculates at least one of illuminance of a light and a change in light illuminance based on the first image data, and a time delay compensator that calculates a time delay between a first time at which the change in light intensity occurs and a second time at which the first pixel senses the change in light intensity, based on at least one of the illuminance of the light and the change in light illuminance, and generates a second event signal in which the time delay is compensated for. The CMOS image sensor includes a second pixel.

According to example embodiments, an electronic device includes a camera module group that includes a plurality of camera modules each generating an electrical signal based on a light reflected from an object, and an application processor that processes the electrical signal. A first camera module of the plurality of camera modules is implemented with a dynamic vision sensor, and a second camera module of the plurality of camera modules is implemented with an image sensor, the first camera module generates an event signal based on a change in light intensity, and the second camera module generates image data in units of frame. The application processor estimates at least one of illuminance of a light and a change in light illuminance based on the image data, and compensates for a time delay between a first time at which the change in light intensity occurs and a second time at which the first camera module senses the change in light intensity based on at least one of the illuminance of the light and the change in light illuminance.

According to example embodiments, an operating method of an electronic device includes sensing a change in light intensity to generate an event signal, estimating illuminance or a change in illuminance, and compensating for a time delay of the event signal based on the estimated illuminance or the estimated change in illuminance.

BRIEF DESCRIPTION OF THE FIGURES

The above and other objects and features of the present disclosure will become apparent by describing in detail example embodiments thereof with reference to the accompanying drawings.

DETAILED DESCRIPTION

Below, example embodiments of the present disclosure will be described in detail and clearly to such an extent that one skilled in the art easily carries out the present disclosure.

In the detailed description, components described with reference to the terms "unit", "module", "block", "~er or ~or", etc. and function blocks illustrated in drawings will be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
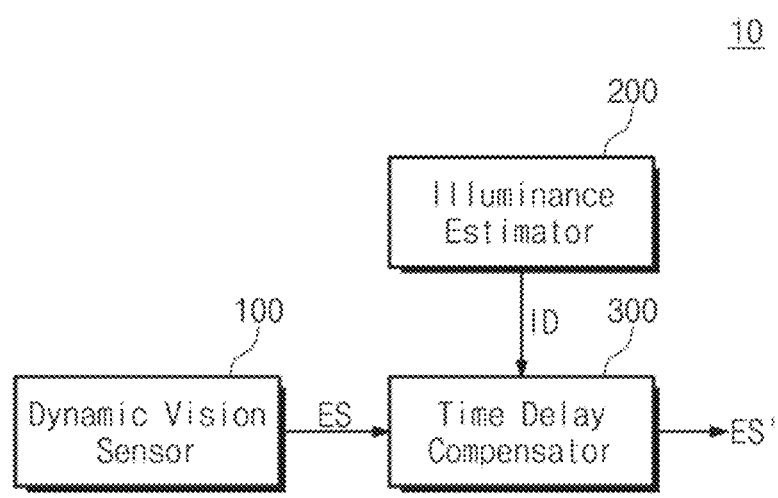
FIG. 1 is a configuration diagram illustrating an electronic device according to example embodiments of the present disclosure.

FIG. 1 is a configuration diagram illustrating an electronic device 10 according to example embodiments of the present disclosure. The electronic device 10 may include a dynamic vision sensor 100, an illuminance estimator 200, and/or a time delay compensator 300. The electronic device 10 may be implemented as a part of various electronic devices such as a desktop computer, a laptop computer, a tablet, a smartphone, a wearable device, a smart speaker, home security Internet of Things (IoT), a video game console, a workstation, a server, and an autonomous vehicle. The electronic device 10 may compensate for a time delay of event occurrence time data of the dynamic vision sensor 100, which is caused by illuminance or a change in illuminance.

The dynamic vision sensor 100 may sense a change in light intensity. For example, the dynamic vision sensor 100 may detect the event (hereinafter referred to as an "on-event") that the intensity of light increases and/or the event (hereinafter referred to as an "off-event") that the intensity of light decreases. When sensing a change in light intensity exceeding an event threshold, the dynamic vision sensor 100 may generate a signal. The dynamic vision sensor 100 may generate an event signal ES as a result of processing the generated signal. According to example embodiments of the present disclosure, the dynamic vision sensor 100 may include a plurality of pixels. For example, the event signal ES may include a value indicating a location of a pixel where an event occurs, a polarity value including information about an on-event or an off-event, and a timestamp value (e.g., time data) indicating a time at which the dynamic vision sensor 100 senses a change in light intensity, and/or the like. A configuration and an operation of the dynamic vision sensor 100 will be described in detail with reference to FIG. 4.

The illuminance estimator 200 may estimate illuminance of an incident light. For example, the illuminance estimator 200 may sense a light incident from an external light source in units of a pixel and may estimate illuminance of the sensed light. In addition, the illuminance estimator 200 may calculate a change in illuminance of the light based on the illuminance of the light, at a plurality of times. The illuminance estimator 200 may generate illuminance information ID based on the estimated illuminance value of the light. For example, the illuminance information ID may include a value indicating the illuminance of the light or the change in illuminance of the light, which corresponds to the event signal ES generated by the dynamic vision sensor 100. For example, the illuminance estimator 200 may be implemented with a sensor (e.g., a photo-resistor) measuring illuminance. However, the present disclosure is not limited thereto. For example, the illuminance estimator 200 may be implemented with any device that directly measures illuminance or indirectly estimates the illuminance.

According to example embodiments of the present disclosure, the illuminance estimator 200 may be implemented with a complementary metal-oxide-semiconductor (CMOS) image sensor (hereinafter referred to as a "CIS"). The CIS may include a plurality of pixels. The pixels of the CIS may correspond to the pixels of the dynamic vision sensor 100. For example, when an aspect ratio of the pixels of the CIS is identical to that of the pixels of the dynamic vision sensor 100 and a resolution of the CIS is identical to that of the dynamic vision sensor 100, the pixels of the CIS may respectively correspond to the pixels of the dynamic vision sensor 100 (e.g., a ratio being 1:1). In contrast, when the aspect ratio of the pixels of the CIS is different from that of the pixels of the dynamic vision sensor 100 and the resolution of the CIS is different from that of the dynamic vision sensor 100, the number of pixels of the CIS may be different from the number of pixels of the dynamic vision sensor 100 (e.g., a ratio being "1:n" or "n:1" (n being an integer of 2 or more)). For example, the dynamic vision sensor 100 may include a first pixel and a second pixel, and the CIS may include a third pixel and a fourth pixel. In some example embodiments, the first pixel may correspond to the third pixel, and the second pixel may correspond to the fourth pixel. In some example embodiments, the illuminance estimator 200 may generate the illuminance information ID corresponding to each pixel of the dynamic vision sensor 100, based on an illuminance value of a pixel of the CIS corresponding to a pixel of the dynamic vision sensor 100. A configuration and an operation of example embodiments in which the illuminance estimator 200 is implemented with the CIS will be described in detail with reference to FIG. 7.

The time delay compensator 300 may calculate a time delay of the time data (e.g., a timestamp value) included in the event signal ES based on the illuminance information ID and may compensate for the time delay. For example, the event signal ES may include a pixel location value, a polarity value, and a timestamp value. Here, a time corresponding to the timestamp value may be a time at which the dynamic vision sensor 100 senses a change in light intensity. The time at which the dynamic vision sensor 100 senses the change in light intensity may be different from a time at which a change in light intensity actually occurs (e.g., an actual event occurrence time). Accordingly, there may be a time delay between the time at which the dynamic vision sensor 100 senses the change in light intensity and the time at which the change in light intensity actually occurs.

As illuminance of a light incident onto the dynamic vision sensor 100 decreases, a delay time (e.g., the degree of time delay) may increase. When a light of high illuminance is incident onto the dynamic vision sensor 100, the dynamic vision sensor 100 may immediately or sufficiently react to a change in light intensity. In some example embodiments, a time delay may be slight (negligible or ignorable). In contrast, when a light of low illuminance (e.g., less than 5 lux) is incident onto the dynamic vision sensor 100, the dynamic vision sensor 100 may fail to immediately or sufficiently react to a change in light intensity. In some example embodiments, the performance of the dynamic vision sensor 100 may be reduced due to a delay time (e.g., 10 ms or more). Also, as a change in illuminance of a light incident onto the dynamic vision sensor 100 becomes smaller, a delay time may increase. A delay time according to illuminance or a change in illuminance of a light will be described in detail with reference to FIGS. 2A and 2B.

The time delay compensator 300 may calculate a time delay of time data included in the event signal ES based on the illuminance information ID and may adjust a timestamp value included in the received event signal ES based on the calculated time delay. The time delay compensator 300 may generate a compensated event signal ES' to which the adjusted timestamp value is applied. How the time delay compensator 300 adjusts a timestamp value will be described in detail with reference to FIG. 3.

According to example embodiments of the present disclosure, when the calculated time delay is less than an arbitrary or given or predetermined or desired reference level, the time delay compensator 300 may not adjust a timestamp value. In example embodiments, when a delay time is less than 10 ms, the reduction of performance of the dynamic vision sensor 100 may be slight (negligible or ignorable), and thus, the time delay compensator 300 may not adjust a timestamp value. In some example embodiments, the compensated event signal ES' that the time delay compensator 300 generates may be identical to the event signal ES.

According to example embodiments of the present disclosure, unlike the example illustrated in FIG. 1, at least some of functions of the illuminance estimator 200 and the time delay compensator 300 may be implemented in the dynamic vision sensor 100. For example, functions of the illuminance estimator 200 and the time delay compensator 300 may be implemented with hardware, software, and/or a combination thereof so as to be included in the dynamic vision sensor 100. In some example embodiments, the dynamic vision sensor 100 may generate the event signal ES by synchronizing time data (e.g., a timestamp value) included in an event signal with an actual event occurrence time.

Figure 2A:
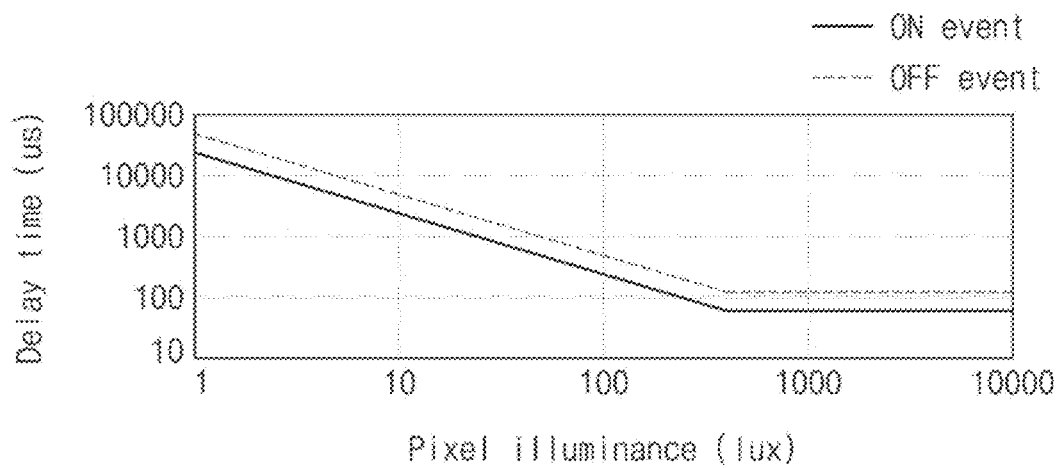
FIG. 2A is a graph illustrating a time delay occurring in a dynamic vision sensor depending on pixel illuminance.

FIG. 2A is a graph illustrating a delay time occurring in a dynamic vision sensor depending on pixel illuminance.

Referring to FIGS. 1 and 2A, a difference between a time corresponding to a timestamp value and an actual event occurrence time, that is, a time delay may occur depending on illuminance (hereinafter referred to as "pixel illuminance") of a light incident onto a pixel of the dynamic vision sensor 100. A time delay according to pixel illuminance may vary depending on a characteristic of the dynamic vision sensor 100, a change in illuminance of a light, and/or an event threshold value. The graph illustrated in FIG. 2A shows a specific time delay of the dynamic vision sensor 100 as an example, but the present disclosure is not limited thereto.

Referring to FIG. 2A, an x-axis may correspond to pixel illuminance, and a y-axis may correspond to a delay time. It is assumed that the change in pixel illuminance is fixed to two times an event threshold value to reduce or prevent a change in a delay time according to a change in pixel illuminance. Here, a change in pixel illuminance may be a log value of a change in pixel illuminance sensed during a unit event sensing period of the dynamic vision sensor 100, which follows a relationship of Equation 1 to be below. An event may be classified as an on-event or an off-event. Because the development of the on-event graph is similar to the development of the off-event graph, for convenience of description, the description will be given with reference to the on-event. When pixel illuminance exceeds a specific level (e.g., about 500 lux), because the pixel illuminance exceeds an input upper limit of the dynamic vision sensor 100, a time delay may be uniform. When the pixel illuminance is less than or equal to the input upper limit of the dynamic vision sensor 100, the time delay may decrease as the pixel illuminance increases.

Figure 2B:
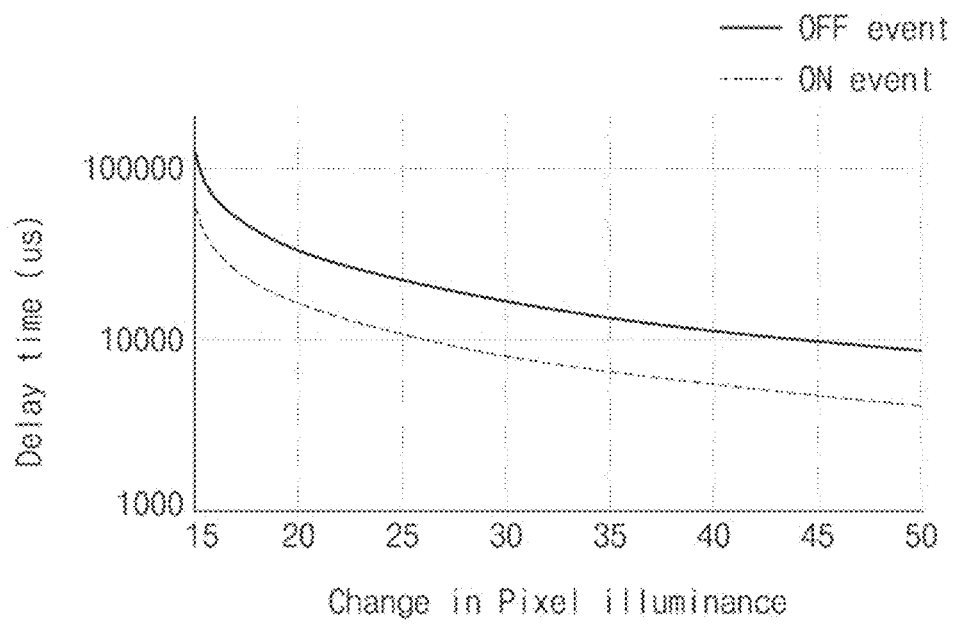
FIG. 2B is a graph illustrating a time delay occurring in a dynamic vision sensor depending on a change in pixel illuminance.

FIG. 2B is a graph illustrating a time delay occurring in a dynamic vision sensor depending on a change in pixel illuminance. The description given with reference to FIG. 2A will be omitted to avoid redundancy. It is assumed that pixel illuminance is 3 lux and an event threshold value is 15%, as an example. Referring to FIGS. 1 and 2B, an x-axis may correspond to "change in pixel illuminance*100", and a y-axis may correspond to a delay time. As a change in pixel illuminance decreases, a delay time may increase; as the change in pixel illuminance increases, the delay time may decrease. A delay time according to a change in pixel illuminance may vary depending on a characteristic of the dynamic vision sensor 100, pixel illuminance, and/or an event threshold value. The change in pixel illuminance may follow the relationship of Equation 1 below.

$$\text{Change of pixel } illuminace = \ln\frac{I(t_2)}{I(t_1)} \qquad \text{[Equation 1]}$$

Referring to Equation 1, "t" is defined as a time at which an event is sensed by the dynamic vision sensor 100. Accordingly, when $t_1$ is a current time, $t_2$ may be defined as a next time, and $(t_2-t_1)$ may be an arbitrary or given or predetermined or desired unit event sensing period of the dynamic vision sensor 100. In Equation 1, "I" is defined as pixel illuminance sensed at a sensing time. Accordingly, $I(t_1)$ is defined as pixel illuminance sensed at a current time, and $I(t_2)$ is defined as pixel illuminance sensed at a next time. Accordingly, a change in pixel illuminance is a log value of pixel illuminance sensed during a unit event sensing period.

Figure 3:
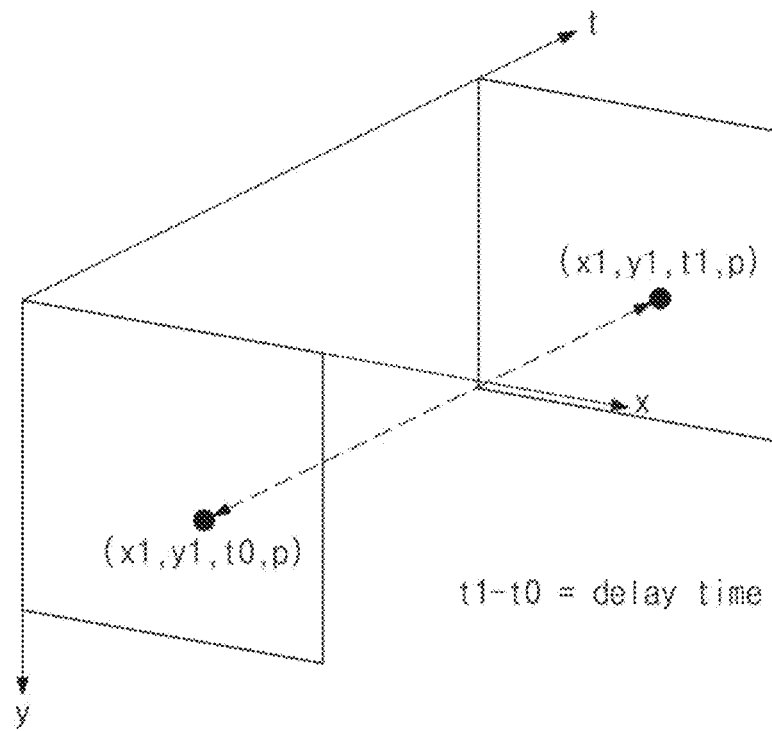
FIG. 3 is a conceptual diagram for describing a method of compensating for a time delay occurring in a dynamic vision sensor according to example embodiments of the present disclosure.

FIG. 3 is a conceptual diagram for describing a method of compensating for a time delay occurring in a dynamic vision sensor according to example embodiments of the present disclosure. Referring to FIGS. 1 and 3, an x-axis and a y-axis may correspond to a location value of a pixel of the dynamic vision sensor 100, at which an event occurs. A t-axis may correspond to a time at which an event occurs. A "p" value may correspond to a polarity value of the dynamic vision sensor 100. For example, when a location value of a pixel where an event occurs is (x1, y1), an actual event occurrence time may be t0. However, due to pixel illuminance and/or a change in pixel illuminance, a time (e.g., t1) corresponding to a timestamp value included in the event signal ES may be delayed with respect to t0 being an actual event occurrence time. A time delay may occur in the dynamic vision sensor 100 as much as $(t_1-t_0)$. Accordingly, the time delay compensator 300 may adjust a timestamp value to a value corresponding to t0 by compensating for the time delay of $(t_1-t0)$ at t1.

Figure 4:
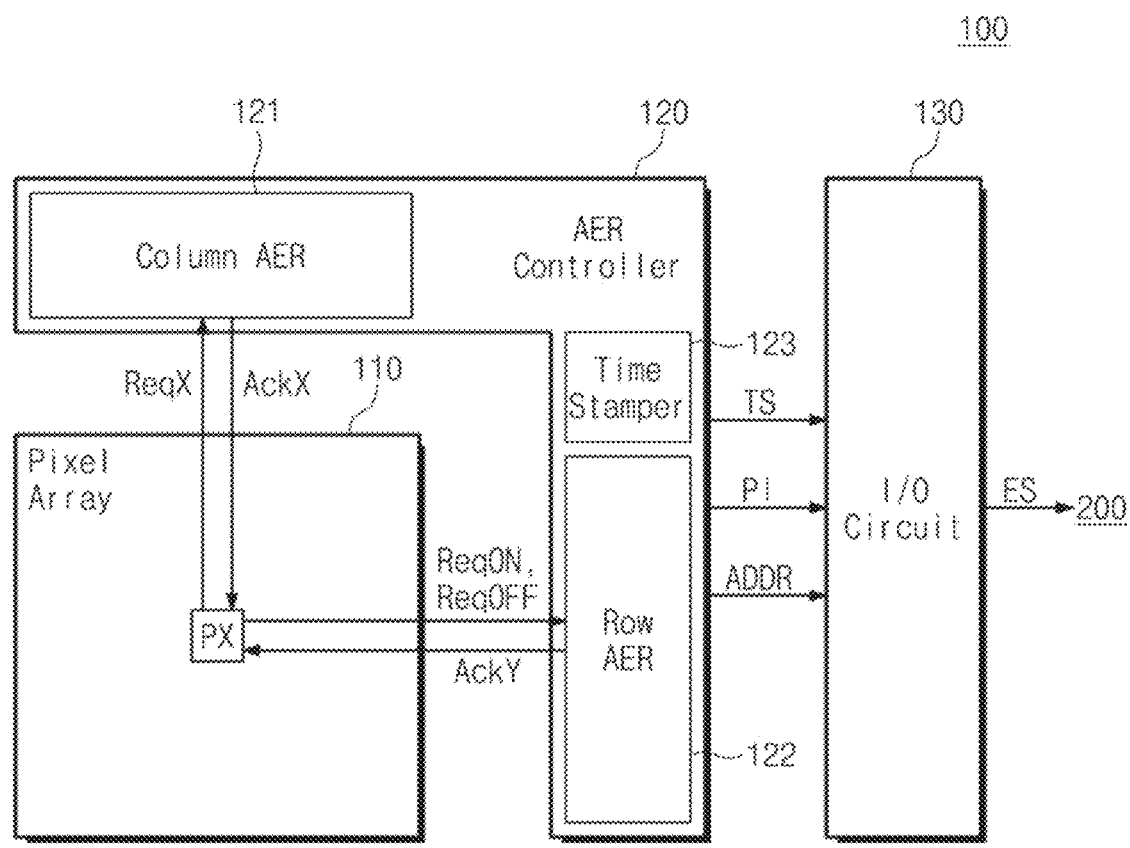
FIG. 4 is a configuration diagram illustrating a configuration of the dynamic vision sensor 100 of FIG. 1 in more detail.

FIG. 4 is a configuration diagram illustrating a configuration of the dynamic vision sensor 100 of FIG. 1 in more detail. The dynamic vision sensor 100 may include a DVS pixel array 110, an address event representation (AER) controller 120, and/or an input/output circuit 130.

The DVS pixel array 110 may include a plurality of pixels arranged along a plurality of rows and a plurality of columns in the form of a matrix. A pixel PX sensing an event from among the plurality of pixels of the DVS pixel array 110 may generate a column request ReqX indicating that an event that the intensity of light increases or decreases occurs. A configuration and an operation of the pixel PX will be described in detail with reference to FIGS. 5 and 6.

The AER controller 120 may include a column AER circuit 121, a row AER circuit 122, and/or a timestamper 123. The AER controller 120 may control the pixel PX that senses the event. The AER controller 120 may generate a timestamp TS, polarity information PI, and a pixel address ADDR based on a plurality of signals ReqX, ReqON, and ReqOFF received from the pixel PX. The AER controller 120 may generate the timestamp TS, the polarity information PI including a polarity value corresponding to an on-event request ReqON and/or an off-event request ReqOFF, and the pixel address ADDR including a column address and a row address corresponding to a pixel location value, in the form of a digital signal.

The column AER circuit 121 may receive the column request ReqX from the pixel PX. The column AER circuit 121 may transmit a column response signal AckX to the pixel PX in response to the received column request ReqX. The pixel PX that receives the column response signal AckX may transmit the on-event request ReqON and/or the off-event request ReqOFF to the row AER circuit 122. The column AER circuit 121 may generate the column address of the pixel PX sensing an event based on the column request ReqX received from the pixel PX sensing the event, and the column address may constitute a portion of the address ADDR.

The row AER circuit 122 may receive the on-event request ReqON and/or the off-event request ReqOFF from the pixel PX. The row AER circuit 122 may transmit a row response signal AckY in response to the on-event request ReqON and/or the off-event request ReqOFF. The pixel PX may generate a reset signal in response to the column response signal AckX and the row response signal AckY. The reset signal may reset the pixel PX where the event occurs. The row AER circuit 122 may generate the row address of the pixel PX sensing the event based on the on-event request ReqON and/or the off-event request ReqOFF received from the pixel PX, and the row address may constitute a portion of the address ADDR.

The operations of the column AER circuit 121 and the row AER circuit 122 are not limited to the description given above. Unlike the example illustrated in FIG. 4, the operations of the column AER circuit 121 and the row AER circuit 122 may be interchanged. Accordingly, in some example embodiments, the column AER circuit 121 may receive the on-event request ReqON and/or the off-event request ReqOFF from the pixel PX.

The timestamper 123 may generate the timestamp TS including information about a time at which an event occurs. For example, the timestamper 123 may be implemented by using a timetick that is generated in units of several microseconds to tens microseconds. However, the above unit by which a timetick is generated is an example, and a timetick may vary depending on settings of a manufacturer or a request of a user. According to example embodiments of the present disclosure, the pixel PX may fail to immediately or sufficiently react to event occurrence, thereby causing a time delay. Accordingly, a time delay may occur between an actual event occurrence time and an event occurrence time corresponding to the timestamp TS.

The input/output circuit 130 may generate the event signal ES based on the timestamp TS, the pixel address ADDR, and the polarity information PI. The input/output circuit 130 may add a header informing a start of transmission of a signal at the front of the event signal ES and a tail informing an end of transmission of a signal at the rear thereof.

Figure 5:
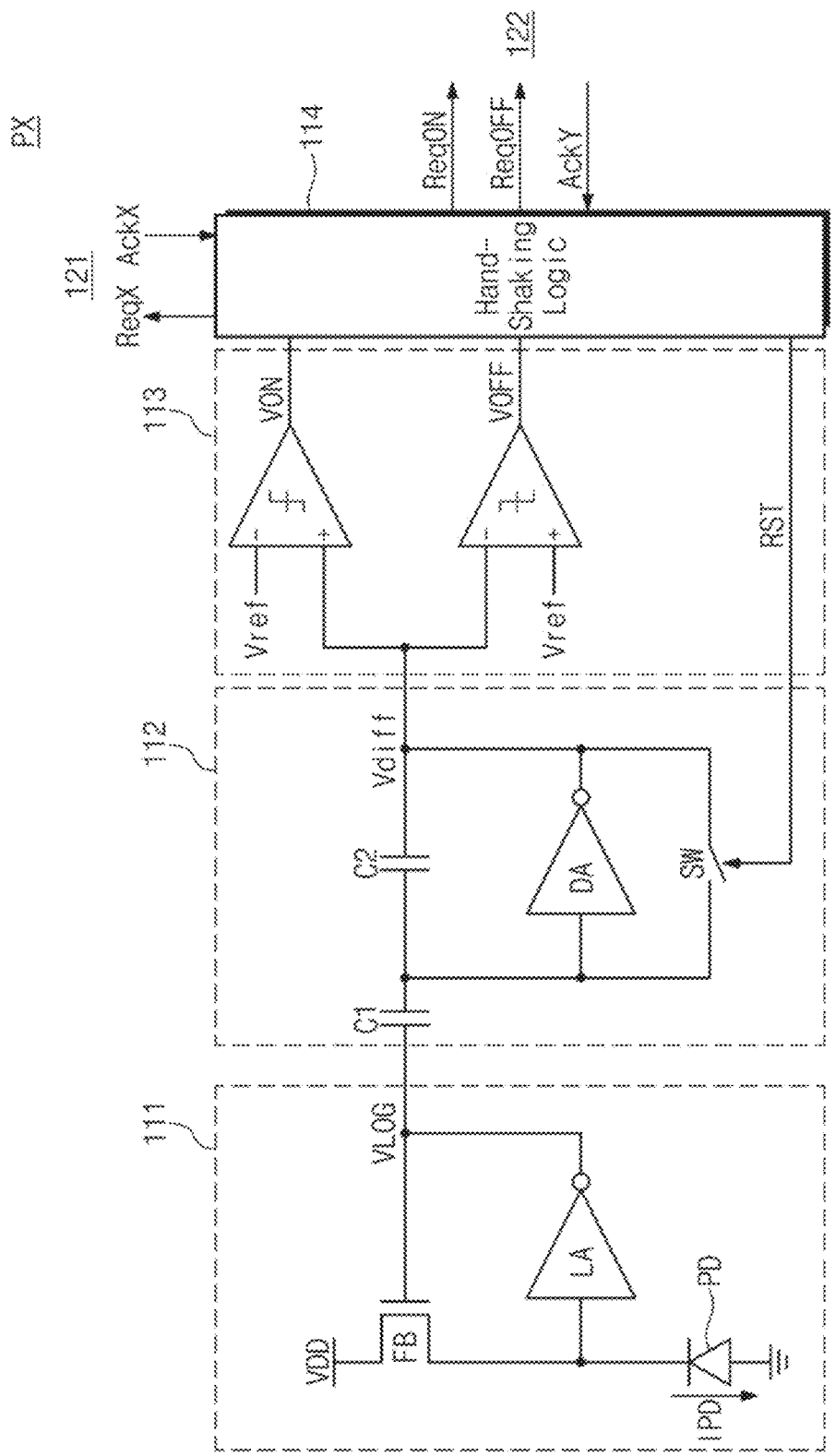
FIG. 5 is a circuit diagram illustrating a configuration of the pixel PX of FIG. 4.

FIG. 5 is a circuit diagram illustrating a configuration of the pixel PX of FIG. 4. For convenience of description, one pixel PX will be described, but the present disclosure is not limited thereto. For example, each of the remaining pixels included in the DVS pixel array 110 (refer to FIG. 4) may have a structure similar to that of the pixel PX of FIG. 5. The pixel PX may include a photoreceptor 111, a differentiator 112, a comparator 113, and/or a hand-shaking logic 114. However, for convenience of description, FIG. 5 will be described with reference to FIG. 4.

The photoreceptor 111 may include a photodiode PD that converts light energy into electrical energy, a log amplifier LA that amplifies a voltage corresponding to a photo current IPD to output a log voltage VLOG of a log scale, and/or a feedback transistor FB that isolates the photoreceptor 111 from the differentiator 112.

The differentiator 112 may amplify the voltage VLOG to generate a voltage Vdiff. For example, the differentiator 112 may include capacitors C1 and C2, a differential amplifier DA, and/or a switch SW, and the switch SW may operate in response to a reset signal RST. For example, the capacitors C1 and C2 may store electrical energy generated by the photodiode PD. For example, capacitances of the capacitor C1 and C2 may be appropriately selected in consideration of the shortest time (e.g., a refractory period) between two events that occur continuously at one pixel. When the switch SW is turned on by the reset signal RST, a pixel may be initialized.

The comparator 113 may compare a level of the output voltage Vdiff of the differential amplifier DA and a level of a reference voltage Vref and may determine whether an event sensed by a pixel is an on-event or an off-event. When an event that the intensity of light increases is sensed, the comparator 113 may output a signal VON indicating that the sensed event is the on-event; when an event that the intensity of light decreases is sensed, the comparator 113 may output a signal VOFF indicating that the sensed event is the off-event.

The hand-shaking logic 114 may transmit the column request ReqX to the column AER circuit 121 in response to the signal VON indicating the on-event or the signal VOFF indicating the off-event. When the column AER circuit 121 transmits the column response signal AckX, the hand-shaking logic 114 may transmit, to the row AER circuit 122, the on-event request ReqON corresponding to the signal VON indicating the on-event or the off-event request ReqOFF corresponding to the signal VOFF indicating the off-event. When the row AER circuit 122 transmits the row response signal AckY, the hand-shaking logic 114 may generate the reset signal RST based on the column response signal AckX and the row response signal AckY. To reduce or prevent a workload from increasing due to occurrence of a lot of events, a period where the reset signal RST is generated may be controlled such that an event does not occur during a specific period.

Figure 6:
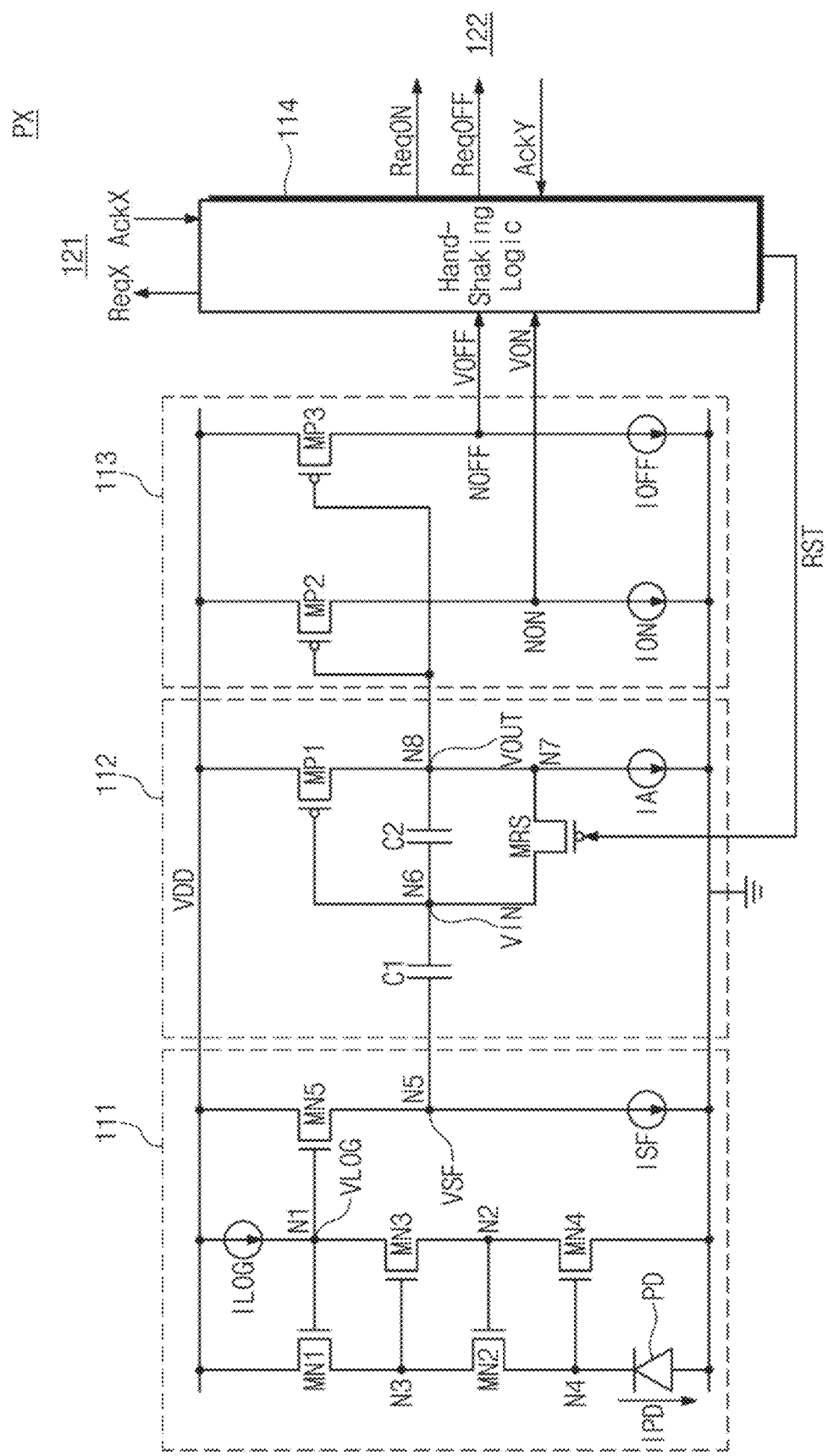
FIG. 6 is a circuit diagram illustrating a configuration of the pixel PX of FIG. 4 in more detail.

FIG. 6 is a circuit diagram illustrating a configuration of the pixel PX of FIG. 5 in more detail. The pixel PX of FIG. 6 shows a transistor-level circuit of the pixel PX of FIG. 5, but the present disclosure is not limited thereto. Referring to FIGS. 4, 5, and 6, the pixel PX may include the photoreceptor 111, the differentiator 112, the comparator 113, and/or the hand-shaking logic 114. The operation or function of each of the photoreceptor 111, the differentiator 112, the comparator 113, and/or the hand-shaking logic 114 is described with reference to FIG. 5, and thus, additional description will be omitted to avoid redundancy.

The photoreceptor 111 may include the photodiode PD, first to fifth NMOS transistors MN1 to MN5, a log current bias ILOG, and/or a source follower current bias ISF. The first to fourth NMOS transistors MN1 to MN4 may constitute a log amplifier. The first NMOS transistor MN1 may be connected between a power supply voltage VDD and a third node N3 and may operate in response to a voltage (e.g., the log amplification voltage VLOG) of a first node N1. The second NMOS transistor MN2 may be connected between the third node N3 and a fourth node N4 and may operate in response to a voltage of a second node N2. The third NMOS transistor MN3 may be connected between the first node N1 and the second node N2 and may operate in response to a voltage of the third node N3. The fourth NMOS transistor MN4 may be connected between the second node N2 and a ground voltage and may operate in response to a voltage of the fourth node N4. The fifth NMOS transistor MN5 may operate as a source follower. The fifth NMOS transistor MN5 may be connected between the power supply voltage VDD and a fifth node N5 and may operate in response to the log amplification voltage VLOG. The log current bias ILOG may be connected between the power supply voltage VDD and the first node N1. The source follower current bias ISF may be connected between the fifth node N5 and the ground voltage.

The differentiator 112 may be connected between the fifth node N5 having a source follower voltage VSF and an eighth node N8 having an output voltage VOUT. The differentiator 112 may include a first capacitor C1, a second capacitor C2, a first PMOS transistor MP1, a reset transistor MRS, and/or an amplifier current bias IA. The first PMOS transistor MP1 may operate as an amplifier. The first PMOS transistor MP1 may be connected between the power supply voltage VDD and the eighth node N8 and may operate in response to an input voltage VIN. The reset transistor MRS may operate as a switch that determines whether to reset a pixel. The reset transistor MRS may be connected between a sixth node N6 and a seventh node N7 and may operate in response to the reset signal RST. The amplifier current bias IA may be connected between the seventh node N7 and the ground voltage.

The comparator 113 may include second and third PMOS transistors MP2 and MP3, an on-event current bias ION, and/or an off-event current bias IOFF. The second PMOS transistor MP2 may be connected between the power supply voltage VDD and an on-event node NON and may operate in response to the output voltage VOUT. The third PMOS transistor MP3 may be connected between the power supply voltage VDD and an off-event node NOFF and may operate in response to the output voltage VOUT. The on-event current bias ION may be connected between the on-event node NON and the ground voltage. The off-event current bias IOFF may be connected between the off-event node NOFF and the ground voltage.

The on-event signal VON corresponding to an on-event may be provided to the hand-shaking logic 114 through the on-event node NON, and the off-event signal VOFF corresponding to an off-event may be provided to the hand-shaking logic 114 through the off-event node NOFF.

Figure 7:
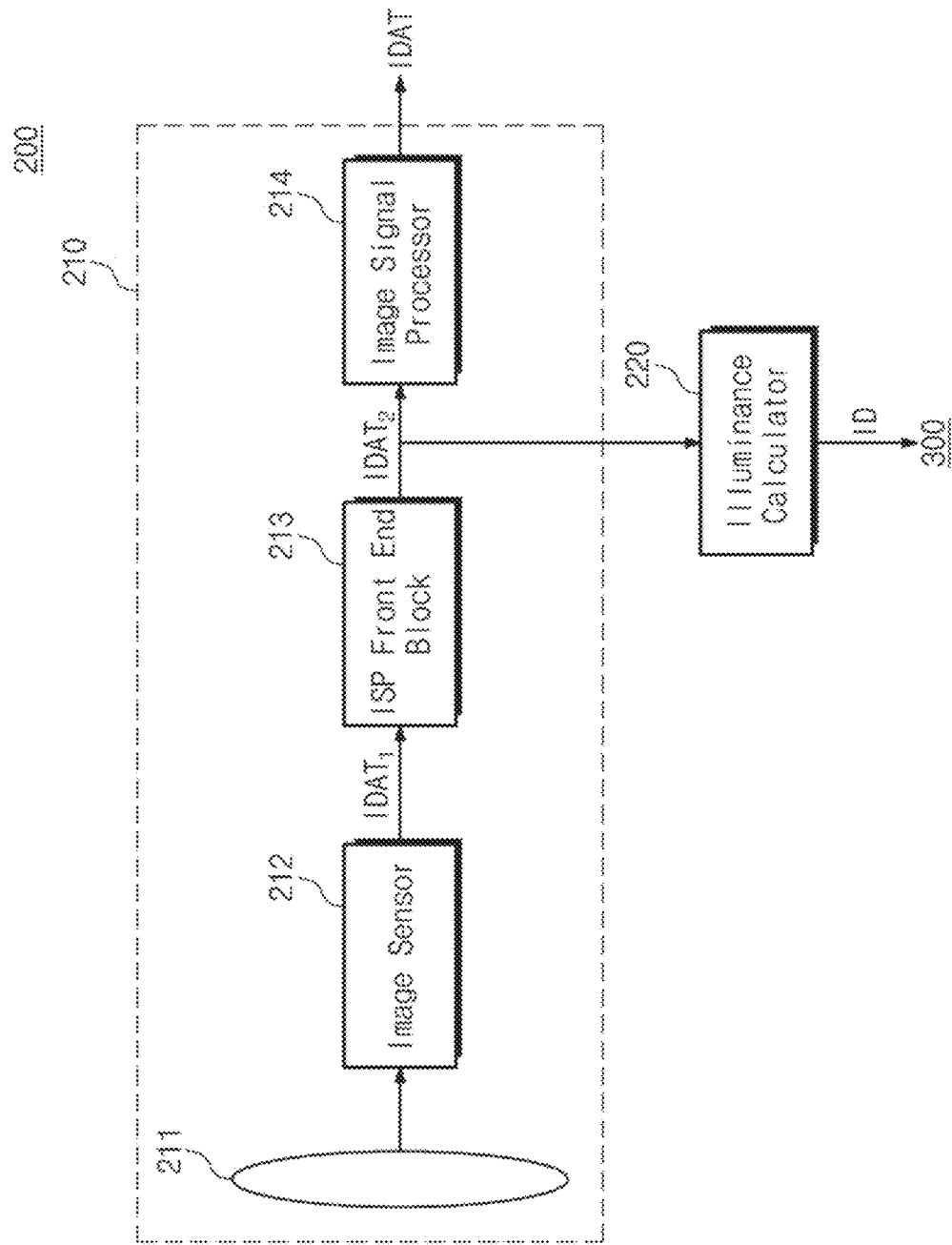
FIG. 7 is a configuration diagram illustrating a configuration of the illuminance estimator 200 of FIG. 1 in more detail.

FIG. 7 is a configuration diagram illustrating a configuration of the illuminance estimator 200 of FIG. 1 in more detail. According to example embodiments of the present disclosure, the illuminance estimator 200 may include an image processing device 210 and/or an illuminance calculator 220.

The image processing device 210 may be implemented as a part of various electronic devices such as a smartphone, a digital camera, a laptop, and a desktop. The image processing device 210 may include a lens 211, an image sensor 212, an ISP front end block 213, and/or an image signal processor 214.

The lens 211 may receive a light reflected by an object, a scenery, etc. targeted for photographing. The lens 211 may move, for example, through an actuator (not illustrated). When a position of the lens 211 varies depending on the movement of the lens 211, a focal distance of the lens 211 may change. As such, the focus on the object may be adjusted. The lens 211 may be provided to be identical in direction and focus to a lens included in the dynamic vision sensor 100 (refer to FIG. 1).

The image sensor 212 may include normal pixels for obtaining color information about an object. The normal pixels of the image sensor 212 may generate an electrical signal based on the light received through the lens 211. In addition, the image sensor 212 may include phase detection pixels for obtaining phase information about the object. The image sensor 212 may include phase detection pixels for adjusting a focal distance. The phase detection pixels of the image sensor 212 may generate an electrical signal, which is used to perform phase detection auto-focus (PDAF), based on the light received through the lens 211. The image sensor 212 may output image data $IDAT_1$ including color information and phase information about the object.

FIG. 7 shows one lens 211 and one image sensor 212. However, in another example, the image processing device 210 may include a plurality of lenses, a plurality of ISP front end blocks, and a plurality of image sensors. The plurality of image sensors may be provided to have different functions, different performances, and/or different characteristics. In some example embodiments, the plurality of image sensors may include lenses having different fields of view (FOV), respectively.

The ISP front end block 213 may perform various pre-processing operations on the image data $IDAT_1$ output from the image sensor 212. For example, the ISP front end block 213 may perform the following processing on the signal output from the image sensor 212: crosstalk compensation, and auto dark level compensation (ADLC) for removing a fixed pattern noise (FPN). The ISP front end block 213 may generate image data IDAT$_2$ experiencing pre-processing.

The image signal processor 214 may perform various processing operations on the image data IDAT$_2$ processed by the ISP front end block 213. For example, the image signal processor 214 may perform various processing operations such as color interpolation, auto white balance, gamma correction, color saturation correction, formatting, bad pixel correction, and/or hue correction. The image signal processor 214 may generate final image data IDAT experiencing various processing operations.

The illuminance calculator 220 may generate the illuminance information ID based on the image data IDAT$_2$. For example, the illuminance calculator 220 may calculate illuminance (e.g., pixel illuminance) of a light incident onto each pixel, based on a pixel value included in the image data IDAT$_2$. A method in which the illuminance calculator 220 according to example embodiments of the present disclosure calculates illuminance will be described in detail with reference to FIG. 8. Although not illustrated in FIG. 7, in other example embodiments, the illuminance calculator 220 may generate the illuminance information ID based on the image data IDAT$_1$ or the final image data IDAT. In example embodiments, at least a portion of the function of the illuminance calculator 220 may be implemented in the ISP front end block 213. In other example embodiments, at least a portion of the function of the illuminance calculator 220 may be implemented with a main processor (e.g., an application processor) that receives and processes the image data IDAT. The function of the illuminance calculator 220 may be implemented with hardware and/or software.

Figure 8:
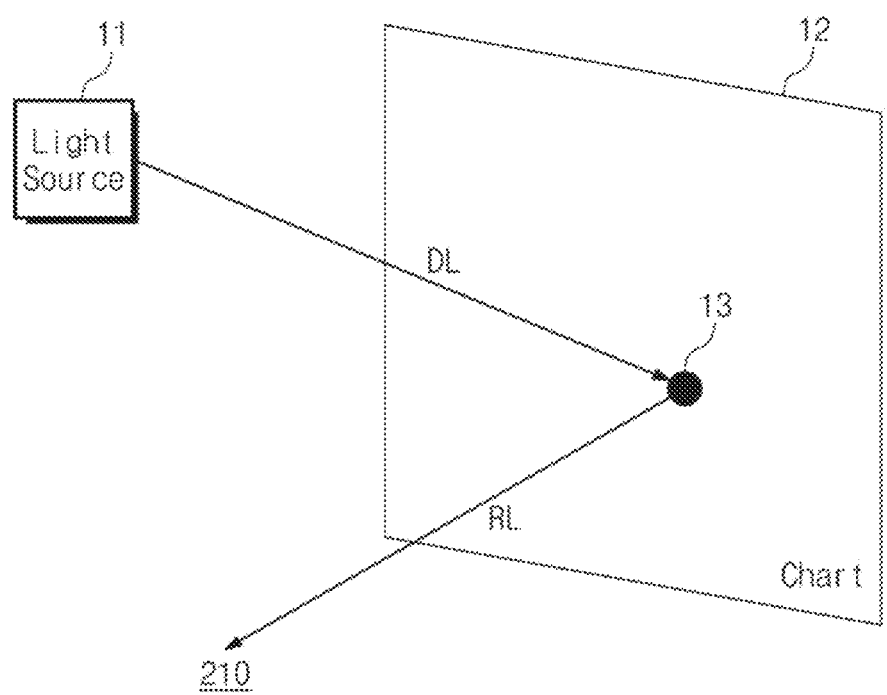
FIG. 8 is a configuration diagram for describing an illuminance calculating method of an illuminance calculator according to example embodiments of the present disclosure.

FIG. 8 is a configuration diagram for describing an illuminance calculating method of the illuminance calculator 220 according to example embodiments of the present disclosure. Referring to FIGS. 7 and 8, a reflection light reflected by an object may be input to the image processing device 210. The reflection light input to the image processing device 210 may be converted into the image data IDAT$_2$ through the lens 211, the image sensor 212, and the ISP front end block 213. The illuminance calculator 220 may calculate pixel illuminance based on the image data IDAT$_2$. Pixel illuminance may be calculated by Equation 2 below.

$$I = \frac{\alpha(p + \beta)}{A_v t_{exposure}} \quad \text{[Equation 2]}$$

Referring to Equation 2, "p" is defined as a pixel value. Each of the pixels of the image sensor 212 may output an electrical signal based a light incident thereon, and a pixel value may correspond to a level of the electrical signal that each of the pixels outputs. "$A_v$" is defined as a gain by the image sensor 212 and the ISP front end block 213. Here, the gain may be based on an analog gain and a digital gain. "$t_{exposure}$" is defined as a time (hereinafter referred to as an "exposure time") during which pixels of the image sensor 212 are exposed to a light. "$A_v$" and "$t_{exposure}$" may vary depending on settings of a manufacturer or a request of a user. α and β are defined as image sensor constant values. Because α and β vary depending on kinds, characteristics, and functions of image processing devices of an image sensor, α and β may be in advance determined before the product shipping of the electronic device 10 (refer to FIG. 1).

In example embodiments, α and β may be calculated by testing the image processing device 210 before shipping the image processing device 210 and/or the electronic device 10 (refer to FIG. 1). For example, α and β may be calculated by using a separate test device (not illustrated). Returning to FIG. 8, because a light reflected by an object is incident onto pixels, to set reference pixel values (e.g., a pixel value corresponding to a bright portion and a pixel value corresponding to a dark portion), a chart 12 may be used as a test object for the image processing device 210. For example, the chart 12 may be a checker board. A direct light DL from a light source 11 may be reflected at a specific portion 13 of the chart 12, and a reflection light RL reflected by the specific portion 13 may be incident onto the image processing device 210 including the image sensor 212.

For example, it is assumed that reflectance of a black portion of the chart 12 is 3% and reflectance of a white portion thereof is 97%. Reflectance of a chart is not limited thereto and may vary depending on a characteristic of a chart. Also, it is assumed an environment in which the illuminance of the direct light DL is 100 lux. Accordingly, illuminance of the reflection light RL incident onto a pixel after reflected at the black portion, that is, pixel illuminance (hereinafter referred to as "I1") is 100*0.03, and pixel illuminance (hereinafter referred to as "I2") corresponding to a white portion is 100*0.97. According to example embodiments of the present disclosure, the image processing device 210 may output the image data IDAT$_2$, and the image data IDAT$_2$ may include pixel values. A pixel value (hereinafter referred to as "p1") corresponding to the black portion may be "0", and a pixel value (hereinafter referred to as "p2") corresponding to the white portion may be 1023. Also, it is assumed that "$A_v$" of the image sensor 212 is 30 and "$t_{exposure}$" thereof is 40 ms. Equation 3 and Equation 4 for obtaining α and β may be derived based on Equation 2 and the above assumption.

$$100 * 0.03 = \frac{\alpha(0 + \beta)}{30 * 40} \quad \text{[Equation 3]}$$

$$100 * 0.97 = \frac{\alpha(1023 + \beta)}{30 * 40} \quad \text{[Equation 4]}$$

By solving simultaneous equations, that is, Equation 3 and Equation 4, α is 110.264, and β is 32.649. Values corresponding to α and β obtained in the above test process may be stored in a memory (not illustrated) provided inside or outside the illuminance estimator 200. The illuminance calculator 220 may load the values corresponding to α and β from the memory (not illustrated). The illuminance calculator 220 may calculate pixel illuminance according to a pixel value, based on α and β. However, the obtained α and β are only an example. For example, α and β may vary depending on illuminance of the direct light DL, and a characteristic of the image processing device in the image sensor. Accordingly, new α and β by new simultaneous equations may be calculated depending on an illuminance environment, settings of an image sensor, or a model change of an image sensor before shipping the electronic device 10 (refer to FIG. 1), and values corresponding to α and β may be stored in the memory (not illustrated).

Figure 9:
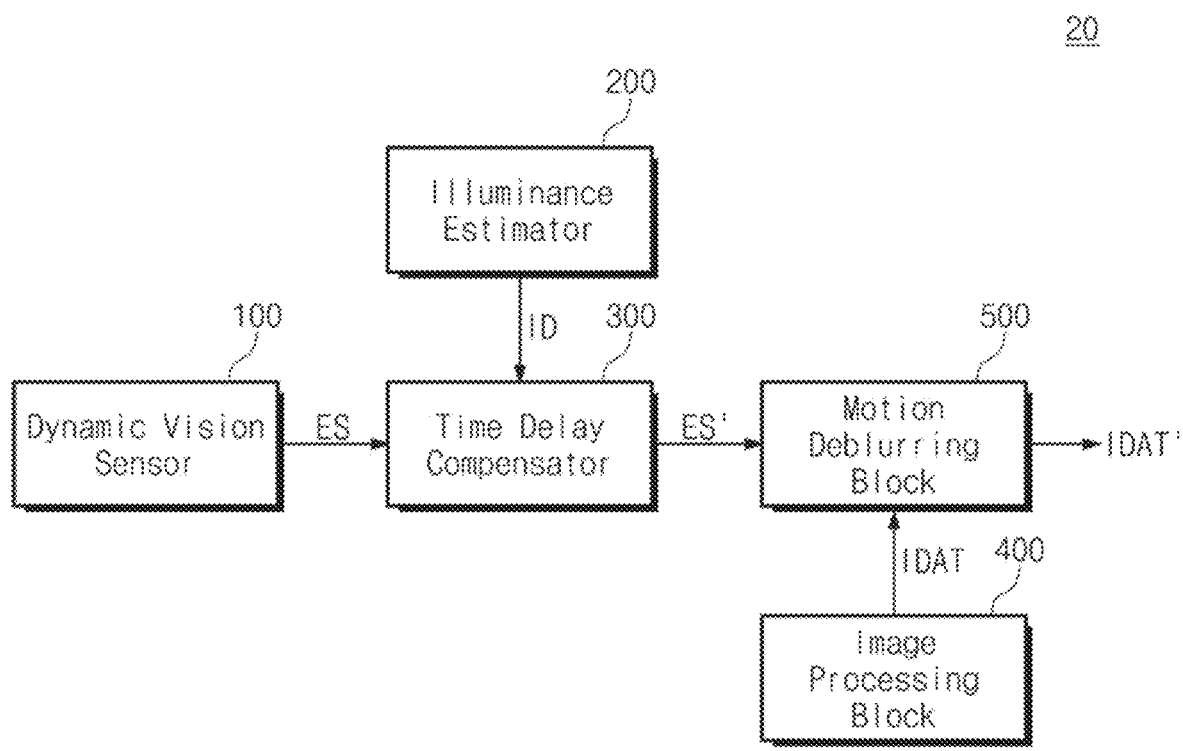
FIG. 9 is a configuration diagram illustrating an electronic device performing motion deblur according to example embodiments of the present disclosure.

FIG. 9 is a configuration diagram illustrating an electronic device 20 performing motion deblur according to example embodiments of the present disclosure. The description given with reference to FIG. 1 will be omitted to avoid redundancy. The electronic device 20 may include the dynamic vision sensor 100, the illuminance estimator 200, the time delay compensator 300, an image processing block

400, and/or a motion deblurring block 500. The time delay compensator 300 may compensate for a time delay of time data of the dynamic vision sensor 100, which is caused by illuminance or a change in illuminance. The time delay compensator 300 may provide the compensated event signal ES' to the motion deblurring block 500.

The image processing block 400 may generate the image data IDAT. The image processing block 400 may perform various operations for processing the image data IDAT. The image processing block 400 may include an image sensor. For example, the image sensor may be implemented with a CIS or CCD image sensor and/or the like. The image sensor may include a plurality of pixels. The pixels of the image sensor may face the same direction as the pixels of the dynamic vision sensor 100. Accordingly, the pixels of the image sensor and the pixels of the dynamic vision sensor 100 may receive a light reflected from the same object. The image sensor may generate the image data IDAT of a frame unit based on charges obtained during a given or predetermined or desired exposure time. In some example embodiments where there is a motion of an object during the exposure time, the image data may be a blurred image in which motion blur occurs. A relationship between a continuous exposure time and a blurred image of a frame unit is expressed by Equation 5 below.

$$B = \frac{1}{T}\int_{f-T/2}^{f+T/2} L(t)dt \qquad \text{[Equation 5]}$$

Referring to Equation 5, "B" is defined as a blurred image, and "T" is defined as an exposure time of the image sensor included in the image processing block 400. L(t) is defined as pixel output data at an exposure time "t", and "f" is defined as a reference time. That is, a blurred image of a frame unit may be generated as a value that is obtained by integrating pixel output data during an exposure time with respect to a continuous time and dividing a result of the integration by the exposure time.

The motion deblurring block 500 may generate deblur image data IDAT' based on the compensated event signal ES' and the image data IDAT. For example, in example embodiments where a motion blur occurs in the image data IDAT, the motion deblurring block 500 may remove the motion blur of the image data IDAT based on the compensated event signal ES'. Although not illustrated in FIG. 9, the motion deblurring block 500 may generate the deblur image data IDAT' based on the event signal ES. However, because a time delay occurring in the dynamic vision sensor 100 depending on illuminance or a change in illuminance is not compensated for, the event signal ES may not be synchronized with the image data IDAT. Accordingly, a motion blur removing effect of the deblur image data IDAT' based on the event signal ES may be lower than that of the deblur image data IDAT' based on the compensated event signal ES'. The motion deblurring block 500 is illustrated as a separate block, but a function of at least a part of the motion deblurring block 500 may be implemented in the image processing block 400.

The compensated event signal ES' may be a set of discontinuous data that are sampled by a time unit shorter than a period in which a frame of the image data IDAT is generated. A method of obtaining a change in light intensity up to a specific time based on a discontinuous event signal may follow Equation 6 below.

$$E(t) = \int_f^t e(s)ds \qquad \text{[Equation 6]}$$

Referring to Equation 5 and Equation 6 together, "s" is defined as an event occurrence time. The event occurrence time "s" may correspond to a timestamp value included in the compensated event signal ES'. e(s) may be polarity information at the event occurrence time "s". Here, when the intensity of light increases, the polarity information may be "1"; when the intensity of light decreases, the polarity information may be "−1". Accordingly, E(t) corresponding to the accumulated change in light intensity at a specific time "t" may be a sum of polarity information from the specific time "t" to the reference time "f".

The motion deblurring block 500 may extract a still image at a specific time belonging to an exposure time corresponding to one frame of the image data IDAT based on the compensated event signal ES'. A method of obtaining a still image may follow Equation 7 below.

$$L(t) = L(f)\exp(cE(t)) \qquad \text{[Equation 7]}$$

Referring to Equation 5, Equation 6, and Equation 7 together, the pixel output data L(t) (e.g., still image data) at the specific time "t" may be obtained by multiplying pixel output data L(f) at the reference time "f" by E(t) corresponding to the change in light intensity at "t" in an exponential form. When an equation for the pixel output data L(f) at the reference time "f" is rearranged by using Equation 5 to Equation 7, the relationship shown in Equation 8 below may be followed.

$$\tilde{L}(f) = \tilde{B} - \log\left(\frac{1}{T}\int_{f-\frac{T}{2}}^{f+\frac{T}{2}} \exp(cE(t))dt\right), \qquad \text{[Equation 8]}$$

$$[\tilde{L}(f) = \log(L(f))\tilde{B} = \log B,]$$

Referring to Equation 5 to Equation 8, by substituting the pixel output data L(f) at the reference time "f" into Equation 7, the pixel output data L(t) at the specific time "t", that is, the deblur image data IDAT' corresponding to the still image may be generated. With respect to the electronic device 20 according to example embodiments of the present disclosure, visualization data for the image data IDAT and the deblur image data IDAT' will be described in detail with reference to FIGS. 10 to 12B.

According to example embodiments of the present disclosure, at least some of functions of the remaining components of the electronic device 20 other than the dynamic vision sensor 100, that is, at least some of functions of the illuminance estimator 200, the time delay compensator 300, the image processing block 400, and the motion deblurring block 500 may be implemented in an application processor.

Figure 10:
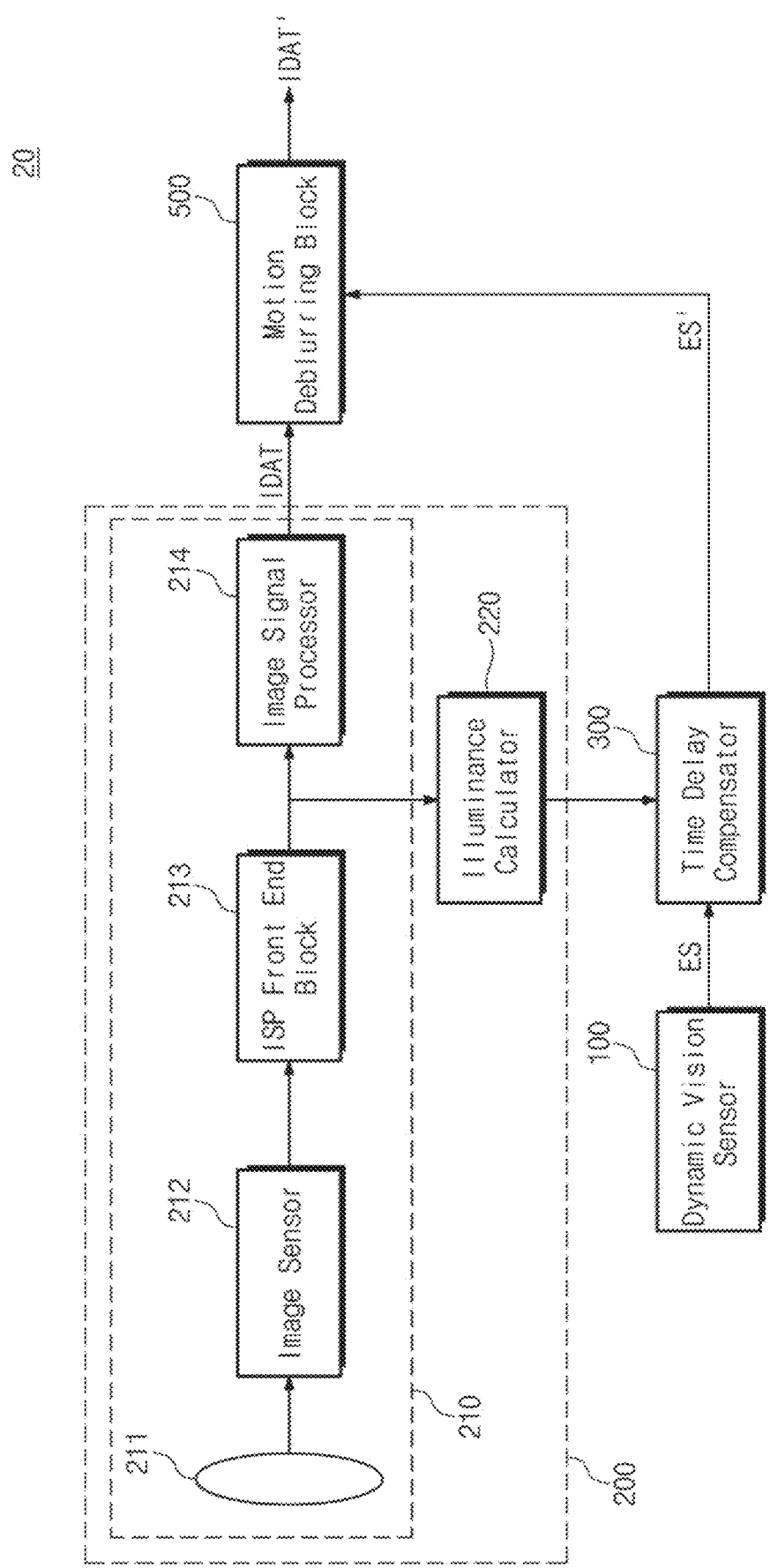
FIG. 10 is a configuration diagram illustrating an electronic device performing motion deblur according to other example embodiments of the present disclosure.

FIG. 10 is a configuration diagram illustrating an electronic device 20 performing motion deblur according to other example embodiments of the present disclosure. The description given with reference to FIGS. 1 and 9 will be omitted to avoid redundancy. The electronic device 20 may include the dynamic vision sensor 100, the illuminance estimator 200, the time delay compensator 300, and/or the motion deblurring block 500. The illuminance estimator 200 may include the image processing device 210 and/or the illuminance calculator 220. The image processing device 210 may generate the image data IDAT and may provide the image data IDAT to the motion deblurring block 500. In the electronic device 20 according to example embodiments of the present disclosure described with reference to FIG. 9, the image data IDAT (refer to FIG. 9) may be provided to the motion deblurring block 500 from the separate image processing block 400 (refer to FIG. 9). In contrast, in the electronic device 20 according to example embodiments of the present disclosure illustrated in FIG. 10, the image data IDAT (refer to FIG. 9) may be provided to the motion deblurring block 500 from the image processing device 210 that the illuminance estimator 200 includes.

Figure 11:
FIG. 11 illustrates original image data according to example embodiments of the present disclosure.

FIG. 11 illustrates image data in which a motion blur occurs, according to example embodiments of the present disclosure. Referring to FIGS. 9 and 11 together, in example embodiments, an object may move at a speed of 0.5 m/s at a distance of 1 m from the image processing block 400. In example embodiments, the image processing block 400 may photograph the object during an exposure time of 100 ms in a low-illuminance environment of 5 lux. Because the object continuously moves during the exposure time, the image processing block 400 may generate the image data IDAT in which a motion blur occurs, that is, a blurred image like FIG. 11.

Figure 12A:
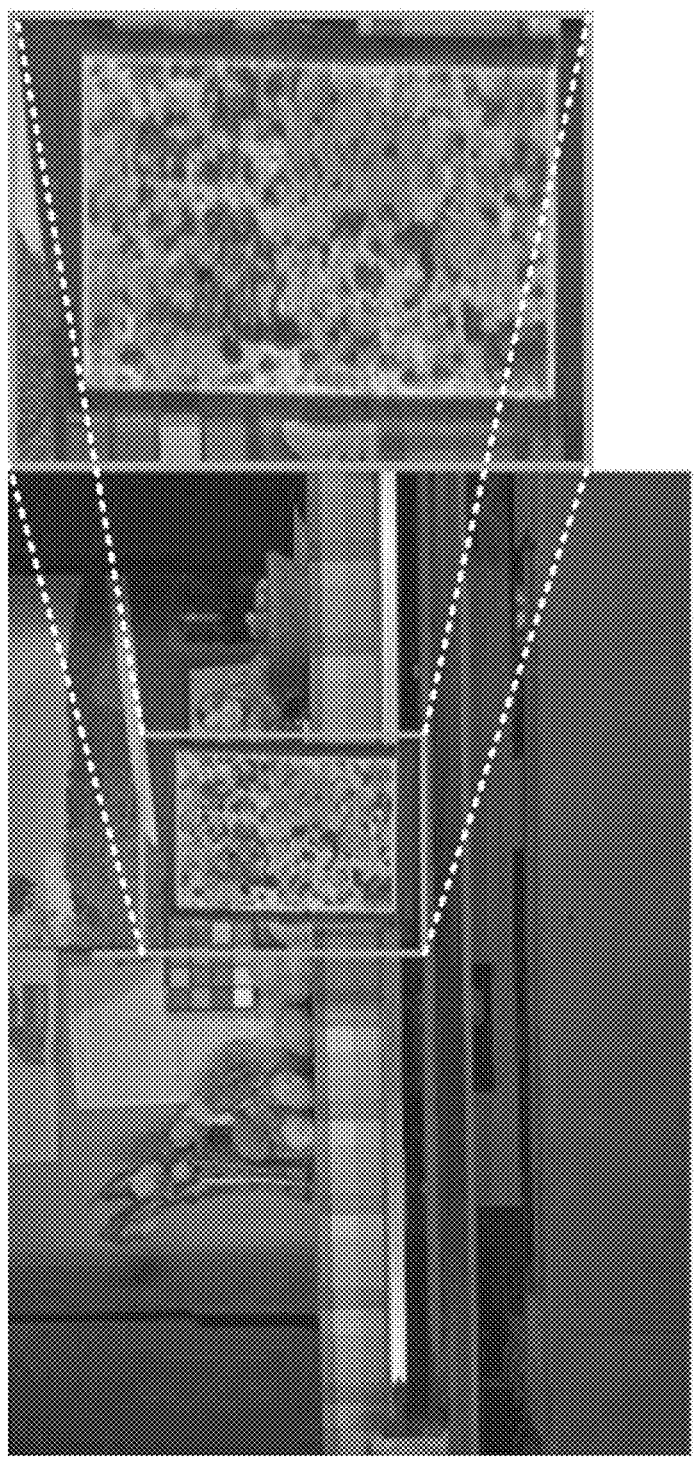
FIG. 12A illustrates image data on which motion deblur is performed by using an original event signal, according to example embodiments of the present disclosure.

FIG. 12A illustrates a still image on which motion deblur is performed by using an original event signal, according to example embodiments of the present disclosure. Referring to FIGS. 9 and 11, it is assumed that the event signal ES that the dynamic vision sensor 100 generates is directly provided to the motion deblurring block 500, as described with reference to FIG. 9. In some example embodiments, the motion deblurring block 500 may extract a still image at a specific time from the image data IDAT based on the event signal ES as illustrated in FIG. 12A. Compared to FIG. 11, it is confirmed from FIG. 12A that a motion blur is partially removed.

Figure 12B:
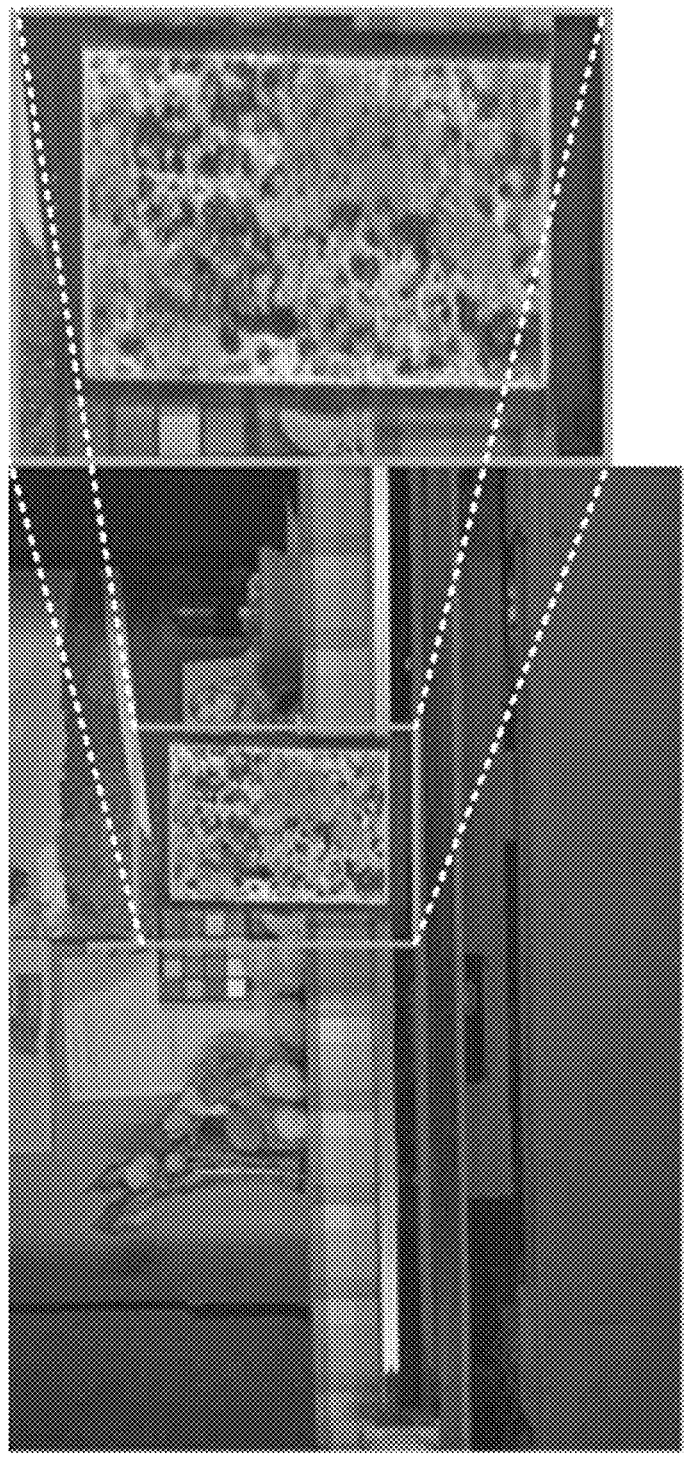
FIG. 12B illustrates image data on which motion deblur is performed by using a compensated event signal, according to example embodiments of the present disclosure.

FIG. 12B illustrates a still image on which motion deblur is performed by using a compensated event signal, according to example embodiments of the present disclosure. Referring to FIGS. 9 and 11, the compensated event signal ES' that the time delay compensator 300 generates may be provided to the motion deblurring block 500. In the compensated event signal ES', because polarity information is provided together with a timestamp value having no time delay, the motion deblurring block 500 may extract a still image at a specific time with a less error. Accordingly, compared to FIG. 12A, it is confirmed from FIG. 12B that a motion blur is further removed.

Figure 13:
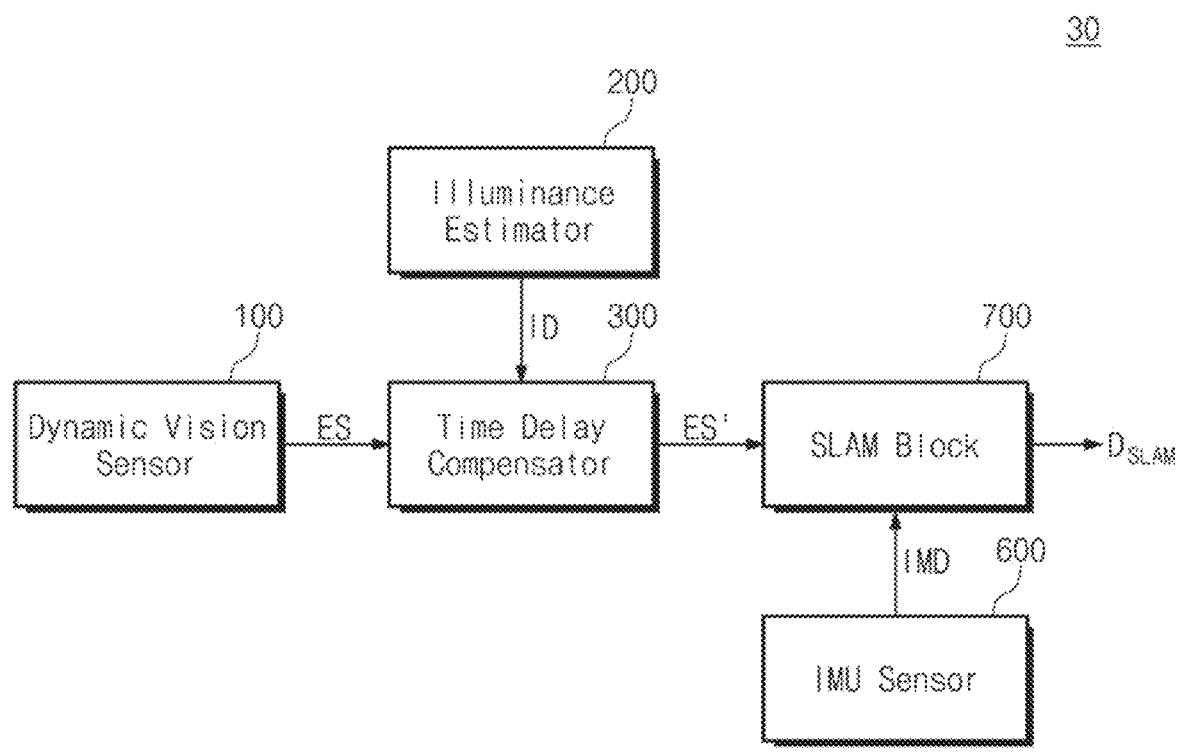
FIG. 13 is a configuration diagram illustrating an electronic device performing simultaneous localization and mapping (SLAM) according to example embodiments of the present disclosure.

FIG. 13 is a configuration diagram illustrating an electronic device 30 performing simultaneous localization and mapping (SLAM) according to example embodiments of the present disclosure. The description given with reference to FIG. 1 will be omitted to avoid redundancy. The electronic device 30 may include the dynamic vision sensor 100, the illuminance estimator 200, the time delay compensator 300, an inertial measurement unit (IMU) sensor 600, and/or an SLAM block 700.

The IMU sensor 600 may generate inertial data IMD by measuring an angle by which the electronic device 30 is inclined. For example, the IMU sensor 600 may include at least one of a gyroscope, an accelerometer, and a geomagnetic sensor. Accordingly, the inertial data IMD may include at least one of angular velocity information, acceleration information, and geomagnetic information.

The SLAM block 700 may create a map by sensing an ambient environment of the electronic device 30 and may estimate a current location of the electronic device 30. The SLAM block 700 may generate SLAM data DSLAM including map and location information. For example, the SLAM block 700 may reduce a sensing error by sensing an ambient environment based on the compensated event signal ES' and utilizing the inertial data IMD. Here, because the compensated event signal ES' is in a state where a time delay is compensated for, the compensated event signal ES' may be synchronized with the inertial data IMD.

Figure 14:
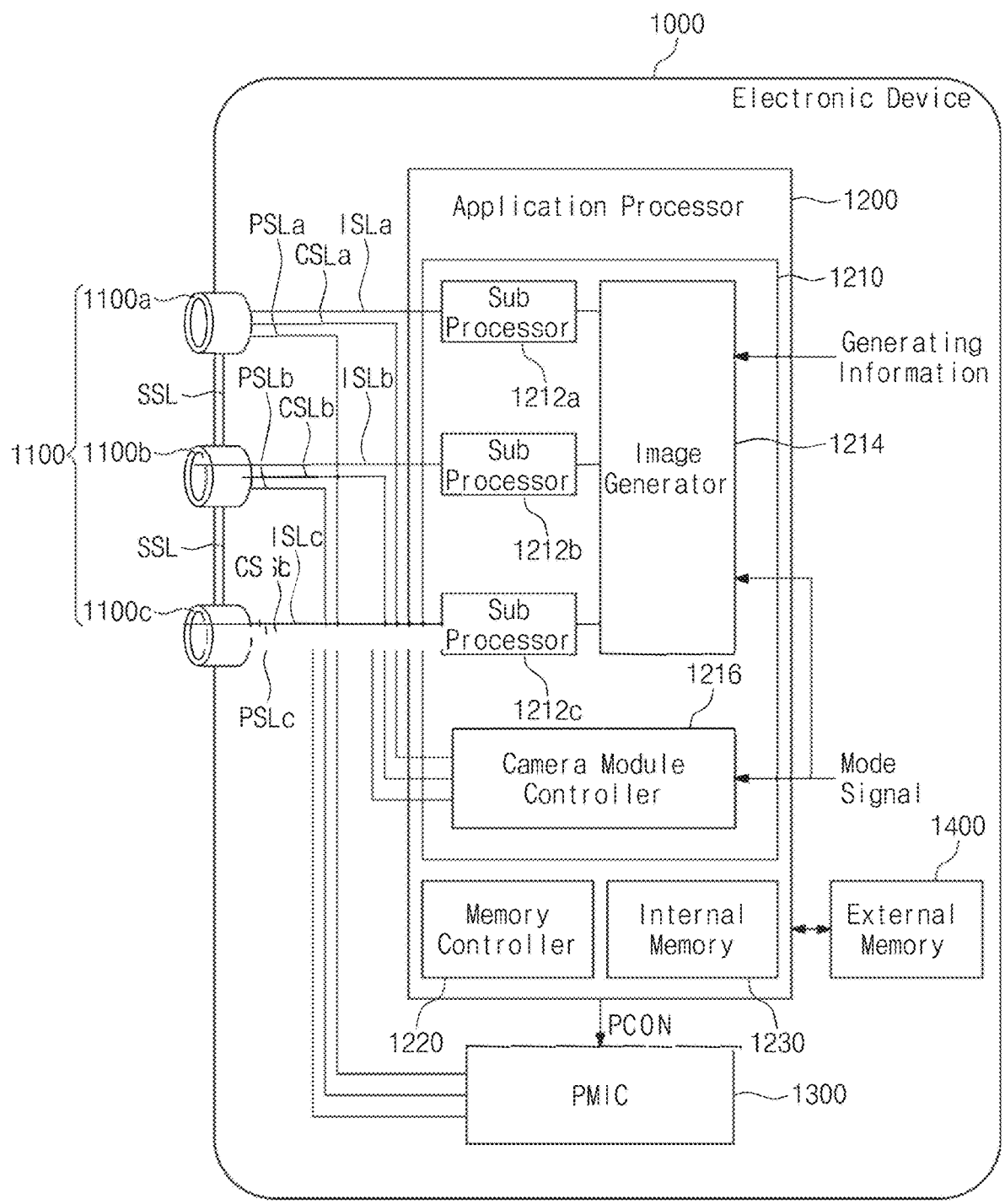
FIG. 14 illustrates a configuration of an electronic device including a camera module in which a dynamic vision sensor of the present disclosure is implemented.

FIG. 14 illustrates a configuration of an electronic device including a camera module to which a dynamic vision sensor of the present disclosure is applied.

Referring to FIG. 14, an electronic device 1000 may include a camera module group 1100, an application processor 1200, a PMIC 1300, and/or an external memory 1400.

The camera module group 1100 may include a plurality of camera modules 1100a, 1100b, and 1100c. An electronic device including three camera modules 1100a, 1100b, and 1100c is illustrated in FIG. 14, but the present disclosure is not limited thereto. The plurality of camera modules 1100a, 1100b, and 1100c may generate electrical signals based on a light reflected from an object, a scenery, and/or the like. In some example embodiments, the camera module group 1100 may be modified to include only two camera modules. Also, in some example embodiments, the camera module group 1100 may be modified to include "n" camera modules (n being a natural number of 4 or more). Although not illustrated in FIG. 14, each of the plurality of camera modules 1100a, 1100b, and 1100c may include a prism, an optical path folding element, an actuator, an image sensing device, and storage.

In some example embodiments, at least one of the camera modules 1100a, 1100b, and 1100c may be implemented with a dynamic vision sensor. For example the camera module 1100a may be implemented with a dynamic vision sensor, and the camera module 1100b may be implemented with an image sensor (e.g., a CIS). In some example embodiments, the camera module 1100a may generate an event signal based on a change in the intensity of light, and the camera module 1100b may generate image data. According to example embodiments of the present disclosure, the plurality of camera modules 1100a, 1100b, and 1100c may have the same fields of view.

In some example embodiments, at least two camera modules (e.g., 1100a and 1100b) among the plurality of camera modules 1100a, 1100b, and 1100c may have different fields of view. In some example embodiments, the at least two camera modules (e.g., 1100a and 1100b) among the plurality of camera modules 1100a, 1100b, and 1100c may include different optical lens, not limited to.

Also, in some example embodiments, fields of view of the plurality of camera modules 1100a, 1100b, and 1100c may be different. In some example embodiments, the plurality of camera modules 1100a, 1100b, and 1100c may include different optical lens, not limited thereto.

In some example embodiments, the plurality of camera modules 1100a, 1100b, and 1100c may be disposed to be physically separated from each other. That is, the plurality of camera modules 1100a, 1100b, and 1100c may not use a sensing area of one image sensor, but the plurality of camera modules 1100a, 1100b, and 1100c may include independent image sensors therein, respectively.

The application processor 1200 may include an image processing device 1210, a memory controller 1220, and/or an internal memory 1230. The application processor 1200 may be implemented to be separated from the plurality of camera modules 1100a, 1100b, and 1100c. For example, the application processor 1200 and the plurality of camera modules 1100a, 1100b, and 1100c may be implemented with separate semiconductor chips.

The image processing device 1210 may include a plurality of sub image processors 1212a, 1212b, and 1212c, an image generator 1214, and/or a camera module controller 1216. The image processing device 1210 may include the plurality of sub image processors 1212a, 1212b, and 1212c, the number of which corresponds to the number of the plurality of camera modules 1100a, 1100b, and 1100c.

Image data respectively generated from the camera modules 1100a, 1100b, and 1100c may be respectively provided to the corresponding sub image processors 1212a, 1212b, and 1212c through separated image signal lines ISLa, ISLb, and ISLc. For example, the image data generated from the camera module 1100a may be provided to the sub image processor 1212a through the image signal line ISLa, the image data generated from the camera module 1100b may be provided to the sub image processor 1212b through the image signal line ISLb, and the image data generated from the camera module 1100c may be provided to the sub image processor 1212c through the image signal line ISLc. This image data transmission may be performed, for example, by using a camera serial interface (CSI) based on the MIPI (Mobile Industry Processor Interface), but the present disclosure is not limited thereto.

In some example embodiments, the camera module 1100a may be implemented with a dynamic vision sensor. In some example embodiments, an event signal generated from the camera module 1100a may be provided to the sub image sensor 1212a through the image signal line ISLa. Also, the camera module 1100b may be implemented with an image sensor (e.g., a CIS). Image data generated from the camera module 1100b may be provided to the sub image sensor 1212b through the image signal line ISLb. The sub image processor 1212b may estimate pixel illuminance based on the image data generated from the camera module 1100b. Although not illustrated, the sub image processor 1212b may provide information about the estimated pixel illuminance to the sub image processor 1212a. The sub image processor 1212a may compensate for an event occurrence time delay of the dynamic vision sensor based on the information about the estimated pixel illuminance.

In some example embodiments, one sub image processor may be disposed to correspond to a plurality of camera modules. For example, the sub image processor 1212a and the sub image processor 1212c may be integrally implemented, not separated from each other as illustrated in FIG. 12; in some example embodiments, one of the pieces of image data respectively provided from the camera module 1100a and the camera module 1100c may be selected through a selection element (e.g., a multiplexer), and the selected image data may be provided to the integrated sub image processor.

The image data respectively provided to the sub image processors 1212a, 1212b, and 1212c or the event signal may be provided to the image generator 1214. The image generator 1214 may generate an output image by using the image data respectively provided from the sub image processors 1212a, 1212b, and 1212c, depending on image generating information Generating Information or a mode signal.

For example, the image generator 1214 may generate the output image by merging at least a portion of the image data respectively generated from the camera modules 1100a, 1100b, and 1100c having different fields of view, depending on the image generating information Generating Information or the mode signal. Also, the image generator 1214 may generate the output image by selecting one of the image data respectively generated from the camera modules 1100a, 1100b, and 1100c having different fields of view, depending on the image generating information Generating Information or the mode signal.

In some example embodiments, the image generator 1214 may remove a motion blur present in image data output from the camera module 1100b (e.g., a CIS), based on an event signal output from the camera module 1100a (e.g., a dynamic vision sensor).

The camera module controller 1216 may provide control signals to the camera modules 1100a, 1100b, and 1100c, respectively. The control signals generated from the camera module controller 1216 may be respectively provided to the corresponding camera modules 1100a, 1100b, and 1100c through control signal lines CSLa, CSLb, and CSLc separated from each other.

The application processor 1200 may store the received image signals, that is, the encoded image signals in the internal memory 1230 provided therein or the external memory 1400 placed outside the application processor 1200. Afterwards, the application processor 1200 may read and decode the encoded image signals from the internal memory 1230 or the external memory 1400 and may display image data generated based on the decoded image signals. For example, the corresponding one among sub image processors 1212a, 1212b, and 1212c of the image processing device 1210 may perform decoding and may also perform image processing on the decoded image signal.

The image signals provided to the application processor 1200 may be signals that are not encoded. The application processor 1200 may perform image processing on the received image signals or may store the image signals in the internal memory 1230 or the external memory 1400.

The PMIC 1300 may supply powers, for example, power supply voltages to the plurality of camera modules 1100a, 1100b, and 1100c, respectively. For example, under control of the application processor 1200, the PMIC 1300 may supply a first power to the camera module 1100a through a power signal line PSLa, may supply a second power to the camera module 1100b through a power signal line PSLb, and may supply a third power to the camera module 1100c through a power signal line PSLc.

In response to a power control signal PCON from the application processor 1200, the PMIC 1300 may generate a power corresponding to each of the plurality of camera modules 1100a, 1100b, and 1100c and may adjust a level of the power. The power control signal PCON may include a power adjustment signal for each operating mode of the plurality of camera modules 1100a, 1100b, and 1100c. For example, the operating mode may include a low-power mode. In some example embodiments, the power control signal PCON may include information about a camera module operating in the low-power mode and a set power level. Levels of the powers respectively provided to the plurality of camera modules 1100a, 1100b, and 1100c may be identical to each other or may be different from each other. Also, a level of a power may be dynamically changed.

Figure 15:
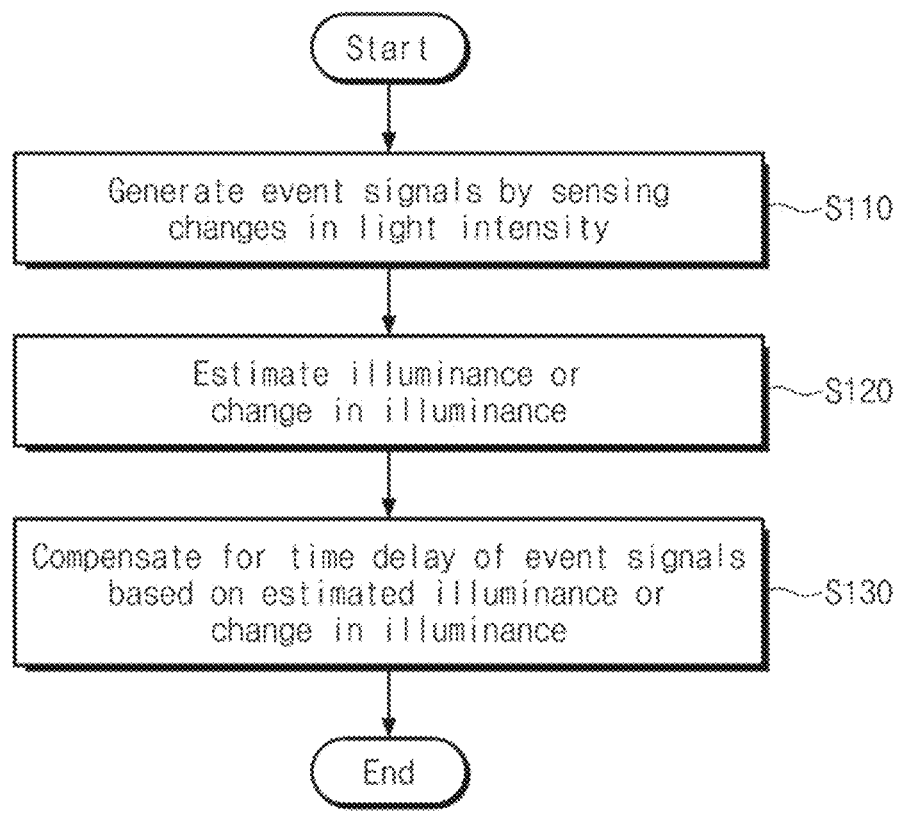
FIG. 15 is a flowchart illustrating an operating method of an electronic device according to example embodiments of the present disclosure.

FIG. 15 is a flowchart illustrating an operating method of an electronic device according to example embodiments of the present disclosure. However, for convenience of description, FIG. 15 will be described with reference to FIG. 1.

In operation S110, the dynamic vision sensor 100 may sense a change in light intensity (e.g., an event) to generate the event signal ES. A time corresponding to a timestamp value included in the event signal ES may differ from an actual event occurrence time.

In operation S120, the illuminance estimator 200 may estimate illuminance or a change in illuminance. For example, the illuminance estimator 200 may estimate illuminance (e.g., pixel illuminance) of a light incident onto each of the pixels of the dynamic vision sensor 100. According to example embodiments of the present disclosure, the illuminance estimator 200 may be implemented with a device including an image sensor (e.g., a CIS). In some example embodiments, the illuminance estimator 200 may estimate pixel illuminance based on image data that the image sensor outputs, and may generate the illuminance information ID including information about the illuminance or the change in illuminance based on the pixel illuminance.

In operation S130, the time delay compensator 300 may compensate for a time delay of the event signal ES based on the estimated illuminance or the estimated change in illuminance. That is, the time delay compensator 300 may compensate for a time delay between a time at which a change in light intensity occurs and a time at which the change in light intensity is sensed. For example, the time delay compensator 300 may adjust a timestamp value so as to correspond to the time at which the change in light intensity occurs. As a result, the time delay compensator 300 may generate the compensated event signal ES'.

Figure 16:
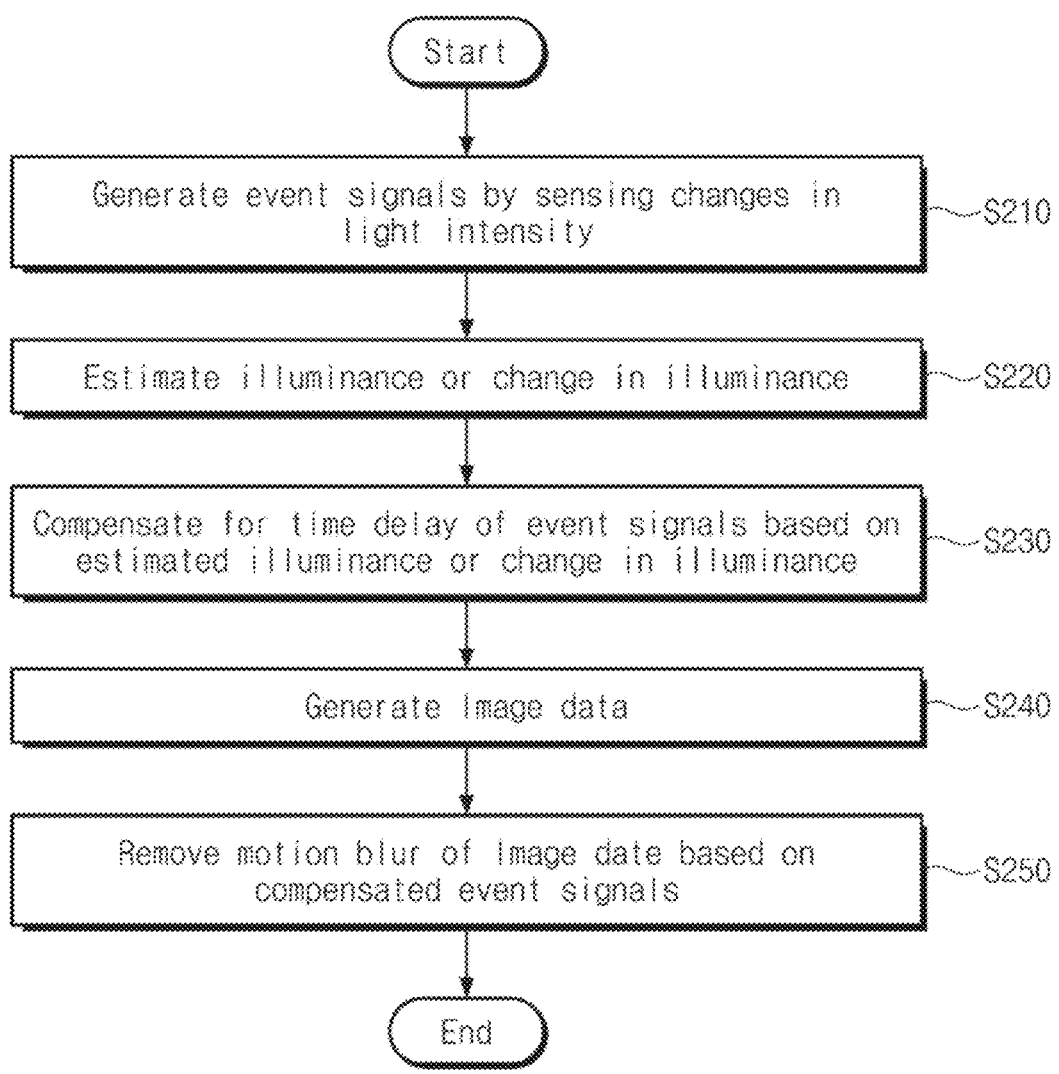
FIG. 16 is a flowchart illustrating an operating method of an electronic device performing motion deblurring according to example embodiments of the present disclosure.

FIG. 16 is a flowchart illustrating an operating method of an electronic device performing motion deblurring according to example embodiments of the present disclosure. Operation S210 to operation S230 are the same as operation S110 to operation S140 of FIG. 15, and thus, additional description will be omitted to avoid redundancy. For convenience of description, FIG. 16 will be described with reference to FIG. 9.

In operation S240, the image processing block 400 may generate the image data IDAT. According to example embodiments of the present disclosure, the image processing block 400 may be the image processing device 210 (refer to FIG. 10) included in the illuminance estimator 200 as illustrated in FIG. 10.

In operation S250, the motion deblurring block 500 may remove a motion blur of the image data IDAT based on the compensated event signal ES'.

According to the present disclosure, consistent performance of a dynamic vision sensor may be provided regardless of external illuminance or a change in illuminance.

According to example embodiments of the present disclosure, motion deblur performance utilizing the dynamic vision sensor may be improved.

Example embodiments are not necessarily mutually exclusive. For example, some example embodiments may include one or more features described with reference to one or more figures and may also include one or more other features described with reference to one or more other figures.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the present disclosure has been described with reference to example embodiments thereof, it will be apparent to those of ordinary skill in the art that various changes and modifications may be made thereto without departing from the spirit and scope of the present disclosure as set forth in the following claims.

What is claimed is:

1. An electronic device comprising:
    a dynamic vision sensor including a first pixel configured to sense a change in light intensity, and configured to generate an event signal based on the sensed change in the light intensity;
    an illuminance estimator configured to estimate illuminance of a light; and
    a time delay compensator configured to calculate a time delay between a first time at which the change in the light intensity occurs and a second time at which the first pixel senses the change in the light intensity, based on the illuminance of the light, and to compensate for the time delay.

2. The electronic device of claim 1, wherein the event signal includes a location value of the first pixel, a polarity value including information about the change in the light intensity, and a timestamp value indicating a time at which the first pixel senses the change in the light intensity.

3. The electronic device of claim 2, wherein the time delay compensator adjusts the timestamp value based on the time delay.

4. The electronic device of claim 1, wherein the illuminance estimator includes:
    an image processing device including an image sensor configured to generate an electrical signal based on an incident light, and configured to generate image data based on the electrical signal; and
    an illuminance calculator configured to calculate pixel illuminance based on the image data.

5. The electronic device of claim 4, wherein the image sensor is implemented with a complementary metal-oxide-semiconductor (CMOS) image sensor.

6. The electronic device of claim 4, wherein the image sensor includes at least one second pixel, and
    wherein the first pixel corresponds to the at least one second pixel.

7. The electronic device of claim 6, wherein the at least one second pixel generates the electrical signal,
    wherein the image data include a pixel value corresponding to the electrical signal, and
    wherein the illuminance calculator calculates the pixel illuminance based on the pixel value.

8. The electronic device of claim 6, wherein the at least one second pixel and the first pixel receive the light reflected from a same object.

9. The electronic device of claim 1, wherein, as the illuminance of the light decreases, the time delay increases, the time delay compensator is configured to compensate for the increased time delay.

10. The electronic device of claim 1, wherein the illuminance estimator is configured to calculate a change in the light illuminance based on the estimated illuminance of the light, and
    wherein, as the change in light illuminance decreases, the time delay increases, the time delay compensator is configured to compensate for the increased time delay.

11. An electronic device comprising:
    A dynamic vision sensor including a first pixel configured to sense a change in light intensity, and configured to generate a first event signal based on the sensed change in the light intensity;
    an image processing device including a complementary metal-oxide-semiconductor (CMOS) image sensor configured to generate first image data based on an intensity of light;
    an illuminance calculator configured to calculate at least one of illuminance of a light and a change in light illuminance based on the first image data; and a time delay compensator configured to calculate a time delay between a first time at which the change in the light intensity occurs and a second time at which the first pixel senses the change in the light intensity, based on the at least one of the illuminance of the light and the change in light illuminance, and to generate a second event signal in which the time delay is compensated for, wherein the CMOS image sensor includes a second pixel.

12. The electronic device of claim 11, wherein the first pixel corresponds to the second pixel.

13. The electronic device of claim 12, wherein the dynamic vision sensor further includes a third pixel configured to sense a change in the light intensity, and generates a third event signal based on the change in the light intensity that the third pixel senses, wherein the CMOS image sensor further includes a fourth pixel, and wherein the third pixel corresponds to the fourth pixel.

14. The electronic device of claim 13, wherein the first event signal includes first time data, wherein the third event signal includes second time data, wherein the first image data includes a first pixel value corresponding to a first electrical signal that the second pixel generates, and a second pixel value corresponding to a second electrical signal that the fourth pixel generates, wherein the illuminance calculator calculates at least one of first pixel illuminance and a change in first pixel illuminance based on the first pixel value and calculates at least one of second pixel illuminance and a change in second pixel illuminance based on the second pixel value, and wherein the time delay compensator generates the third event signal, which is obtained by compensating for a first time delay for the first time data based on the at least one of the first pixel illuminance and the change in first pixel illuminance, and generates a fourth event signal, which is obtained by compensating for a second time delay for the second time data based on the at least one of the second pixel illuminance and the change in second pixel illuminance.

15. The electronic device of claim 11, further comprising:
an image processing block configured to generate second image data; and
a motion deblurring block configured to remove a motion blur present in the second image data.

16. The electronic device of claim 15, wherein the image processing block generates the second image data based on charges obtained during an exposure time corresponding to a frame according to settings of a manufacturer or a request of a user, and wherein the motion deblurring block extracts a still image at a specific time belonging to the exposure time based on the second event signal and generates deblurred image data based on the still image at the specific time.

17. The electronic device of claim 15, wherein the second image data are generated in units of a frame, and wherein the second event signal is a set of discontinuous data sampled at a time period shorter than a frame generation period.

18. The electronic device of claim 11, further comprising:
a motion deblurring block configured to remove a motion blur present in the first image data.

19. The electronic device of claim 11, further comprising:
an inertial measurement unit (IMU) sensor configured to generate inertial data by measuring an inclined angle; and
a simultaneous localization and mapping (SLAM) block configured to estimate a current location by sensing an ambient environment and creating a map, based on the second event signal and the inertial data.

20. An electronic device comprising:
a camera module group including a plurality of camera modules each generating an electrical signal based on a light reflected from an object; and
an application processor configured to process the electrical signal,
wherein a first camera module of the plurality of camera modules is implemented with a dynamic vision sensor, and a second camera module of the plurality of camera modules is implemented with an image sensor,
wherein the first camera module generates an event signal based on a change in light intensity,
wherein the second camera module generates image data in units of frame,
wherein the application processor estimates at least one of illuminance of a light and a change in light illuminance based on the image data, and compensates for a time delay between a first time at which the change in the light intensity occurs and a second time at which the first camera module senses the change in the light intensity based on at least one of the illuminance of the light and the change in the light illuminance.

* * * * *